(12) United States Patent
Spitzer et al.

(10) Patent No.: US 10,564,715 B2
(45) Date of Patent: Feb. 18, 2020

(54) DUAL-PATH FOVEATED GRAPHICS PIPELINE

(71) Applicant: Google LLC, Mountain View, CA (US)

(72) Inventors: Mark Spitzer, Sharon, MA (US);
Carlin Vieri, Menlo Park, CA (US);
Eric Turner, Mountain View, CA (US);
Behnam Bastani, San Jose, CA (US)

(73) Assignee: GOOGLE LLC, Mountain View ( * ) Notice: Subject to any disclaimer, the term of this patent is extended or adjusted under 35 U.S.C. 154(b) by 138 days.

(21) Appl. No.: 15/351,196

(22) Filed: Nov. 14, 2016

(65) Prior Publication Data

US 2018/0136720 A1      May 17, 2018

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G06F 3/147* (2013.01); *G06T 1/20* (2013.01); *G06T 3/40* (2013.01); *G09G 5/006* (2013.01); *G09G 5/391* (2013.01); *G09G 5/003* (2013.01); *G09G 2320/0261* (2013.01); *G09G 2340/02* (2013.01); *G09G 2340/0407* (2013.01); *G09G 2340/0457* (2013.01);
(Continued)

(58) Field of Classification Search
CPC ..... G06F 3/013; G06F 3/147; G02B 27/0093; G06T 1/20; G06T 3/40; G09G 5/006; G09G 5/391
See application file for complete search history.

(56) References Cited

U.S. PATENT DOCUMENTS 5,103,306 A      4/1992   Weiman et al.
6,424,343 B1 *   7/2002   Deering .................... G06T 5/20
                                                      345/419
(Continued)

FOREIGN PATENT DOCUMENTS

CN      104867453 A      8/2015
EP      2 388 773 A2    11/2011
(Continued)

OTHER PUBLICATIONS

U.S. Appl. No. 15/351,200, filed Nov. 14, 2016, listing Mark Spitzer (et al.) as inventor(s), entitled "Early Sub-Pixel Rendering".
(Continued)

*Primary Examiner* — Abderrahim Merouan

(57) ABSTRACT

A foveated display system includes a rendering device including at least one graphics processing unit (GPU) to render a foveal region and a peripheral region of a first image, wherein the foveal region has a higher resolution than the peripheral region. The system further includes a display device coupled to the rendering device via at least one physical layer. The display device includes a pixel array and a display controller coupled to the pixel array. The display controller includes a scaling component to upscale the first peripheral region to generate a scaled first peripheral region and a blending component to blend the foveal region with the scaled first peripheral region to generate a second image.

19 Claims, 14 Drawing Sheets

FOVEAL REGION 302         PERIPHERAL REGION 306

(51) Int. Cl.
*G06F 3/147* (2006.01)
*G09G 5/391* (2006.01)
*G09G 5/00* (2006.01)
*G06T 1/20* (2006.01)
*G06T 3/40* (2006.01)

(52) U.S. Cl.
CPC ..... *G09G 2340/12* (2013.01); *G09G 2350/00* (2013.01); *G09G 2352/00* (2013.01); *G09G 2354/00* (2013.01)

(56) References Cited

U.S. PATENT DOCUMENTS

| | | |
|---|---|---|
| 2003/0142099 A1* | 7/2003 | Deering .............. G09G 5/391 345/531 |
| 2008/0030660 A1 | 2/2008 | Roth |
| 2008/0198128 A1 | 8/2008 | Tsai et al. |
| 2008/0259011 A1 | 10/2008 | Hayashi |
| 2008/0297520 A1 | 12/2008 | Montag |
| 2009/0052772 A1 | 2/2009 | Speirs et al. |
| 2009/0251475 A1 | 10/2009 | Mathur |
| 2011/0025696 A1 | 2/2011 | Wyatt |
| 2011/0152969 A1* | 6/2011 | Zehnder .............. A61F 9/08 607/53 |
| 2011/0228110 A1 | 9/2011 | Thorson |
| 2012/0319928 A1 | 12/2012 | Rhodes |
| 2014/0232735 A1 | 8/2014 | Jeong |
| 2015/0015590 A1 | 1/2015 | Jeong et al. |
| 2015/0117774 A1 | 4/2015 | Yang et al. |
| 2015/0125086 A1 | 5/2015 | Jeong et al. |
| 2015/0326891 A1 | 11/2015 | Austin |
| 2015/0371613 A1 | 12/2015 | Patel |
| 2016/0098812 A1 | 4/2016 | Yoon et al. |
| 2016/0121073 A1 | 5/2016 | Mok |
| 2016/0125851 A1 | 5/2016 | Jin |
| 2016/0260196 A1 | 9/2016 | Roimela |
| 2016/0267884 A1 | 9/2016 | Binstock et al. |
| 2016/0335741 A1 | 11/2016 | Zhao |
| 2016/0335948 A1 | 11/2016 | Wen |
| 2016/0335985 A1 | 11/2016 | Ebberson |
| 2016/0335986 A1 | 11/2016 | Bae |
| 2016/0343283 A1 | 11/2016 | He et al. |
| 2017/0039682 A1 | 2/2017 | Oh et al. |
| 2017/0053071 A1 | 2/2017 | Caputo |
| 2017/0169602 A1* | 6/2017 | Blackmon .............. G06F 3/013 |
| 2017/0287112 A1 | 10/2017 | Stafford et al. |
| 2017/0287446 A1 | 10/2017 | Young |
| 2017/0287447 A1* | 10/2017 | Barry .................. G02B 27/017 |
| 2017/0316601 A1* | 11/2017 | Kakarlapudi .......... G09G 5/373 |
| 2018/0061084 A1 | 3/2018 | Mitchell et al. |
| 2018/0061116 A1* | 3/2018 | Mitchell ................ G06T 15/20 |
| 2019/0122642 A1* | 4/2019 | Morein ................ G09G 5/391 |

FOREIGN PATENT DOCUMENTS

| | | |
|---|---|---|
| KR | 20140048645 A | 4/2014 |
| KR | 101733309 B | 5/2017 |

OTHER PUBLICATIONS

U.S. Appl. No. 15/351,205, filed Nov. 14, 2016 listing Mark Spitzer (et al.) as inventor(s), entitled "Low Resolution RGB Rendering For Efficient Transmission".
Non-Final Rejection dated Dec. 28, 2017 for U.S. Appl. No. 15/351,200, 35 pages.
International Search Report and Written Opinion for PCT Application No. PCT/US2017/052521, 15 pages.
Invitation to Pay Additional Fees dated Dec. 14, 2017, for PCT Application No. PCT/US2017/052920, 16 pages.
International Search Report and Written Opinion dated Nov. 29, 2017 for PCT Application No. PCT/US2017/052533, 14 pages.
Combined Search and Examination Report dated Mar. 22, 2018 for Great Britain Application No. GB1715632.4, 7 pages.
U.S. Appl. No. 15/135,944, filed Apr. 22, 2016 listing Mark Spitzer et al. as inventor(s), entitled "Foveally-Rendered Display".
International Search Report and Written Opinion dated Feb. 5, 2018 for PCT Application No. PCT/US2017/052920, 20 pages.
Final Rejection dated Jul. 12, 2018 for U.S. Appl. No. 15/351,200, 19 pages.
Non-Final Office Action dated Jan. 25, 2019 for U.S. Appl. No. 15/351,205, 17 pages.
Notice of Allowance dated Dec. 4, 2018 for U.S. Appl. No. 15/351,200, 11 pages.
Restriction Requirement dated Jun. 29, 2018 for U.S. Appl. No. 15/351,205, 7 pages.
International Preliminary Report on Patentability dated May 23, 2019 for PCT Application No. PCT/US2017/052521, 9 pages.
International Preliminary Report on Patentability dated May 23, 2019 for PCT Application No. PCT/US2017/052920, 13 pages.
Final Office Action dated Jul. 9, 2019 for U.S. Appl. No. 15/351,205, 16 pages.

* cited by examiner

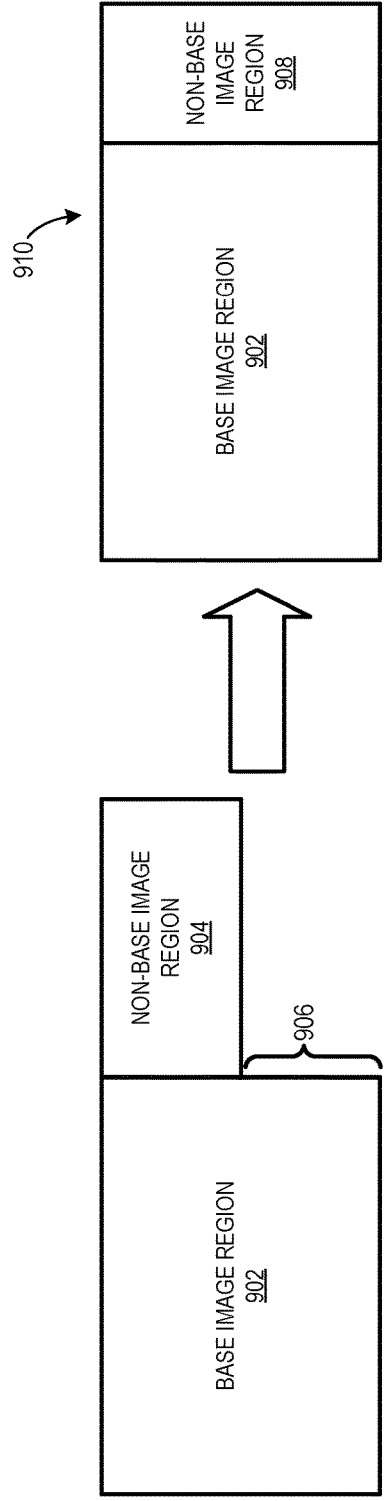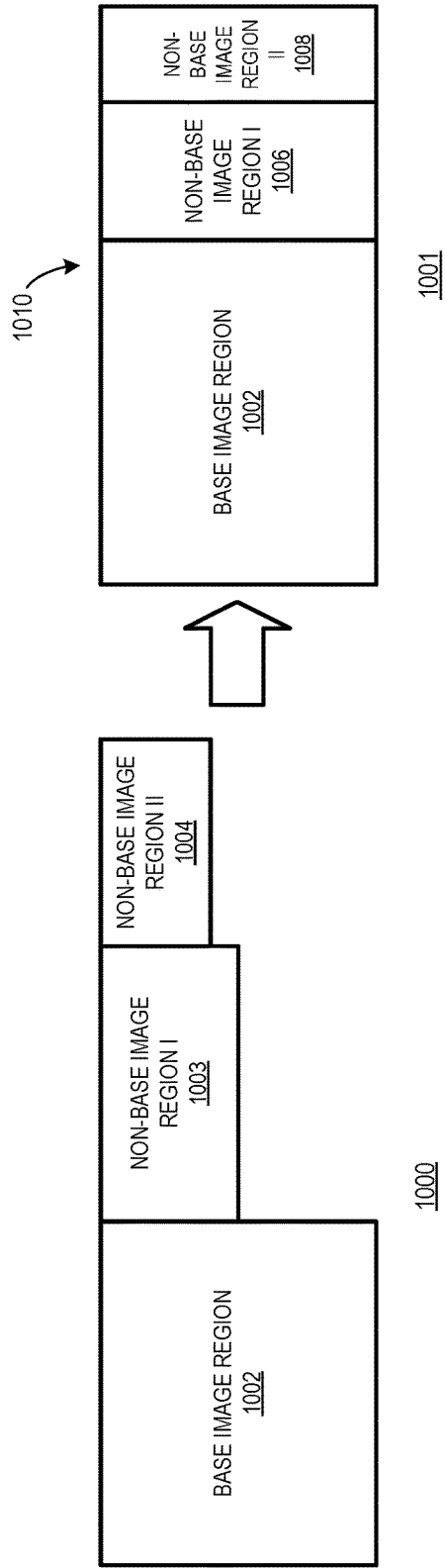

DUAL-PATH FOVEATED GRAPHICS PIPELINE

CROSS-REFERENCE TO RELATED APPLICATIONS

The present application is related to the following co-pending patent applications, the entireties of which are incorporated by reference herein:
(1) U.S. patent application Ser. No. 15/351,200, filed on Nov. 14, 2016, entitled "Early Sub-Pixel Rendering"; and
(2) U.S. patent application Ser. No. 15/531,205, filed on Nov. 14, 2016, entitled "Low Resolution RGB Rendering for Efficient Transmission".

BACKGROUND

Virtual reality (VR) and augmented reality (AR) display systems require considerable computing resources and transmission bandwidth to generate high-resolution imagery and to transmit the imagery for display at sufficiently high refresh rates. This is particularly the situation in systems that utilize head mounted display (HMD) devices as the high-throughput image rendering and transmission processes are performed in parallel for each eye of a user. As such, conventional HMD-based display systems often require significant computing resources to render the imagery at a sufficient rate, and a complex and high-power physical layer used to transmit the data representative of the rendered imagery to the one or more display devices.

In an effort to reduce the computing and transmission requirements, conventional VR systems, AR systems, and other near-eye display systems may implement a foveal rendering process, in which the region of an image that is the focus of the eye (that is, falls upon the fovea) is rendered with a higher resolution, while the remainder of the image is rendered at a lower resolution. Foveal rendering thus typically has a lower computational load than conventional full-resolution rendering processes. However, conventional displays used for VR or AR typically have a constant or uniform display pixel density across the entire display panel, due at least in part to the requirement that the display be capable of providing an image to the fovea of a user's eye from any area of the display that the user may gaze upon. As a result, it is still necessary in conventional display systems to deliver high-resolution pixel data to drive such conventional display panels. Accordingly, while computational load may be reduced in rendering the display image, conventional foveal rendering implementations necessitate the transmission of pixel data for each pixel of the display panel between the device rendering the image data and the device displaying the imagery, and thus such systems do not reduce the bandwidth requirements for transmitting display data to the display, nor do they reduce the power consumed by the display backplane in order to clock in the pixel data for the foveally-rendered display image. Moreover, such conventional display systems lack the flexibility to distribute the foveation processes, sub-pixel rendering processes, and other image and pixel processing functions so as to better optimize one or more of power consumption, integrated circuit availability, cost, and other considerations.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 9 is a diagram illustrating an example reshaping process for an image having two image regions of different vertical resolutions in accordance with some embodiments.

FIG. 10 is a diagram illustrating an example reshaping process for an image having three image regions of different vertical resolutions in accordance with some embodiments.

DETAILED DESCRIPTION

Figure 1:
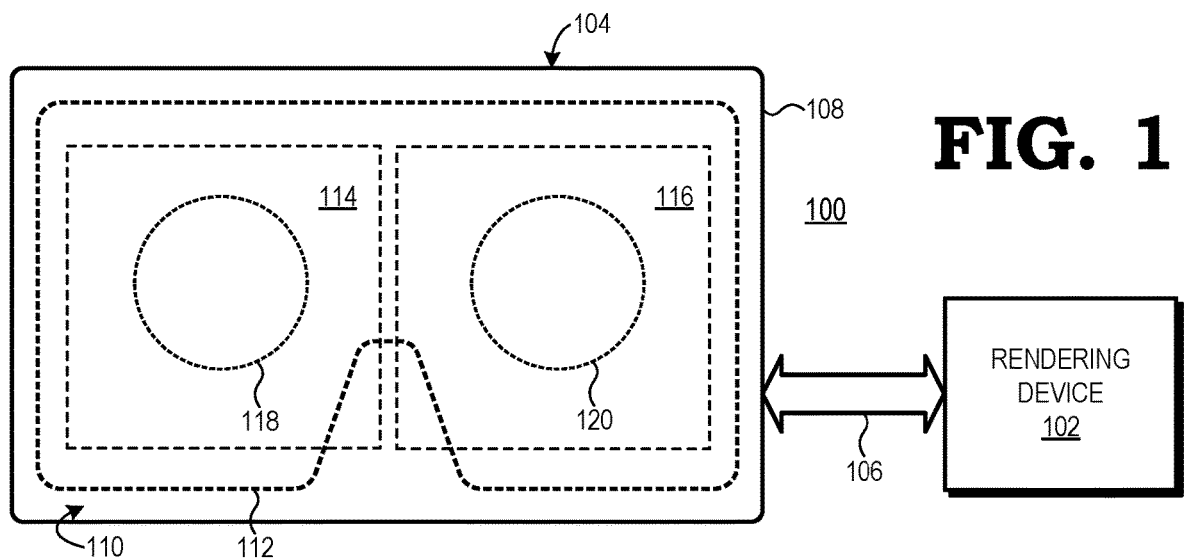
FIG. 1 is a diagram illustrating a foveated display system utilizing a head mounted display (HMD) device and a rendering device in accordance with some embodiments.

The following description is intended to convey a thorough understanding of the present disclosure by providing a number of specific embodiments and details involving foveated display systems and sub-pixel rendered display systems, particularly in the context of VR or AR systems utilizing head mounted display (HMD) devices. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-16 illustrate example systems and techniques for efficient and flexible distribution of image and pixel processing processes in an HMD-based VR/AR system or other display system so as to reduce overall computation efforts and to reduce the amount of pixel data to be transmitted between a rendering device of the display system and a display device of the display system, and thus reduce display power consumption, bandwidth requirements, and associated complexity. As described below with reference to FIGS. 1-13, a display system utilizes a multiple-path foveated graphics pipeline in which the pixel array, or image space, of a display image to be rendered is logically segmented into two or more regions, including at least a foveal region representing the region of the display image which is expected or estimated to be the target of the user's gaze, and at least one peripheral region surrounding this foveal region. A foveal rendering process is employed by a rendering device to foveally render the display image based on the identified regions, with the foveal region being rendered at the highest resolution, and the one or more peripheral regions being rendered at lower resolutions, where, in some embodiments, the resolution of a peripheral region may be based at least in part on the distance of that region from the foveal region. The foveated graphics pipeline then processes and transmits the different regions of the display image via distinct processing/transmission paths between one or more graphics processing units (GPUs) of the rendering device and a display controller of a display device comprising the pixel array used to display the display image.

The implementation of separate processing/transmission paths for each region of the display image permits flexible distribution of various processes pertaining to the processing of the display image between the rendering device and the display controller, and thus facilitating reduction of pixel data to be transmitted over the one or more physical layers connecting the rendering device and display controller, as well as efficiently allocating pixel computation processes between the rendering device and the display controller. To illustrate, rather than scaling any rendered lower-resolution peripheral regions before transmission to the display device having a display as found in conventional foveation systems, in some embodiments, the scaling process is allocated to the display device, and thus the peripheral region is transmitted to the display device in an unscaled form over a physical layer, whereupon the display device then scales the peripheral region. By transmitting the peripheral region in its lower-resolution form over the physical layer, the physical layer may be implemented with a lower bandwidth and correspondingly slower pixel clock.

Typically, a display device employs a red-green-blue (RGB) pixel format in which each pixel of the pixel array of the display panel includes a red sub-pixel, a green sub-pixel, and a blue sub-pixel (and in some instances may further include a white sub-pixel). Accordingly, conventional rendering systems render images in an RGB pixel format that corresponds to the RGB pixel format of the display device. However, some display devices employ a non-RGB pixel format (that is, a pixel format in which each pixel is missing at least one of the red, green, or blue subpixels). To illustrate, a non-RGB pixel format frequently found in organic light emitting diode (OLED)-based display panels is a red-green, blue-green (RGBG) pixel format (often identified via the tradename "PenTile"™), in which each pixel is composed of only two sub-pixels, either a red sub-pixel and a green sub-pixel (RG) or a blue sub-pixel and a green subpixel (BG).

In conventional systems employing such a display panel, the rendering system renders each display image in the RGB pixel format and transmits this display image to the display panel, whereupon a display controller of the display panel then converts the RGB pixel format to the RGBG or other non-RGB pixel format of the pixel array. However, this conventional approach has certain drawbacks. For one, each pixel in the display image transmitted between the rendering device and the display device has three values—that is, a value for each of the three sub-pixels for each pixel of the display image (or four in the case of the implementation of white sub-pixel). In contrast, the pixel-format-converted image provided by the display controller to the pixel array has only two values for each pixel—that is a value for each of the two sub-pixels for each pixel. As a result, unnecessary pixel data is both computed and transmitted over the physical layer connecting the rendering device and the display device, thus increasing the complexity and power consumption of the physical layer. Another drawback of the conventional sub-pixel rendering approach is that the algorithm for performing the RGB to non-RGB pixel format transformation for the image is implemented at the display device. As a developer may not have access to the firmware or hardware of the display device implementing this algorithm or otherwise is unable to effectively modify this firmware or hardware, the developer's ability to optimize the rendering process to take advantage of the sub-pixel format is impaired.

It should be noted that some RGB-based pixel formats include a fourth color element, such as a red-green-blue-white (RGBW) pixel format or a red-green-blue-yellow (RGBY) pixel format. Reference herein to an "RGB pixel format" applies to all pixel formats with at least the three color elements red, blue, and green, and thus further includes RGBW, RGBY, and other RBG-based pixel formats.

Figure 6:
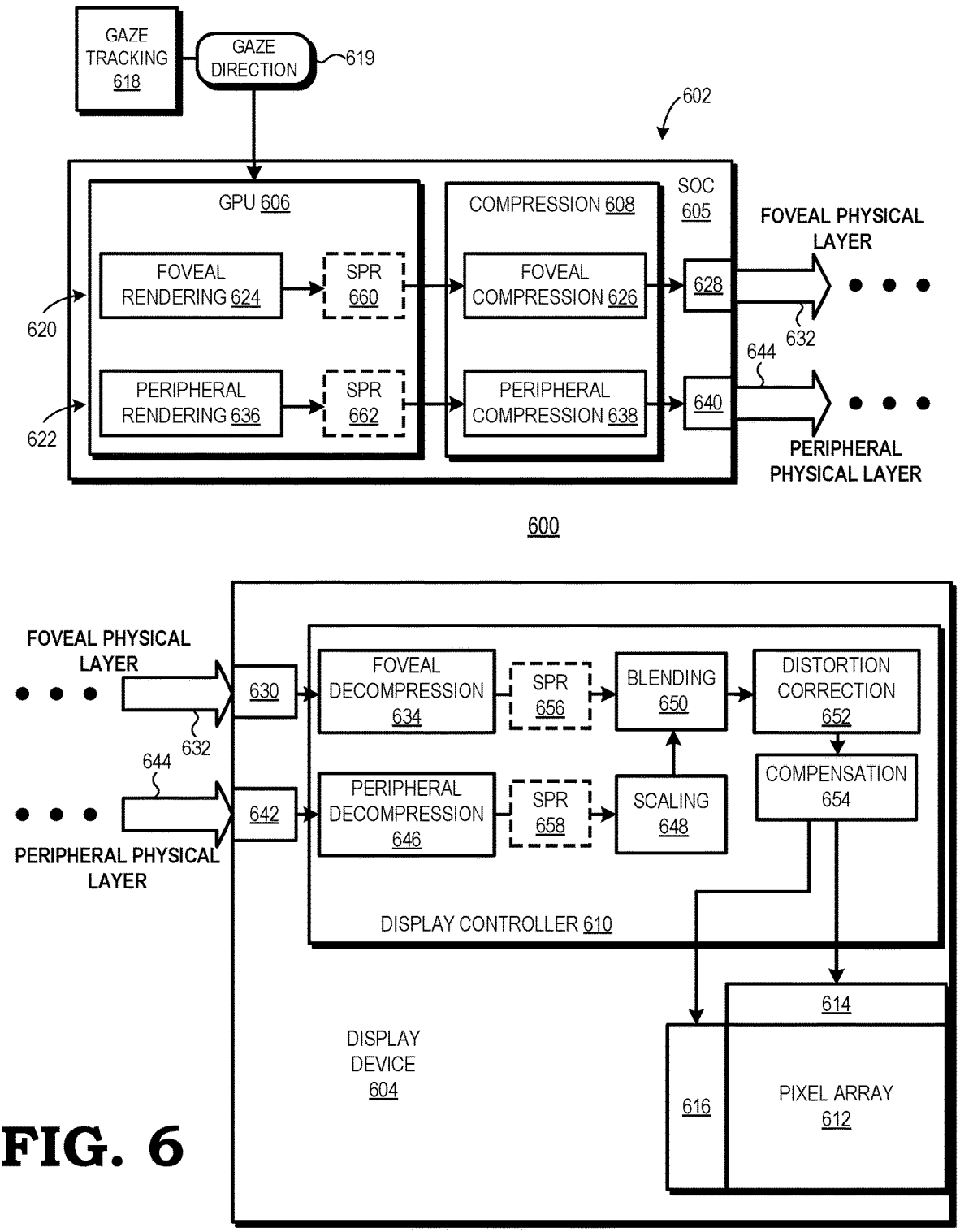
FIG. 6 is a diagram illustrating a foveated display system utilizing a dual-path foveated graphics pipeline in accordance with some embodiments.
Figure 7:
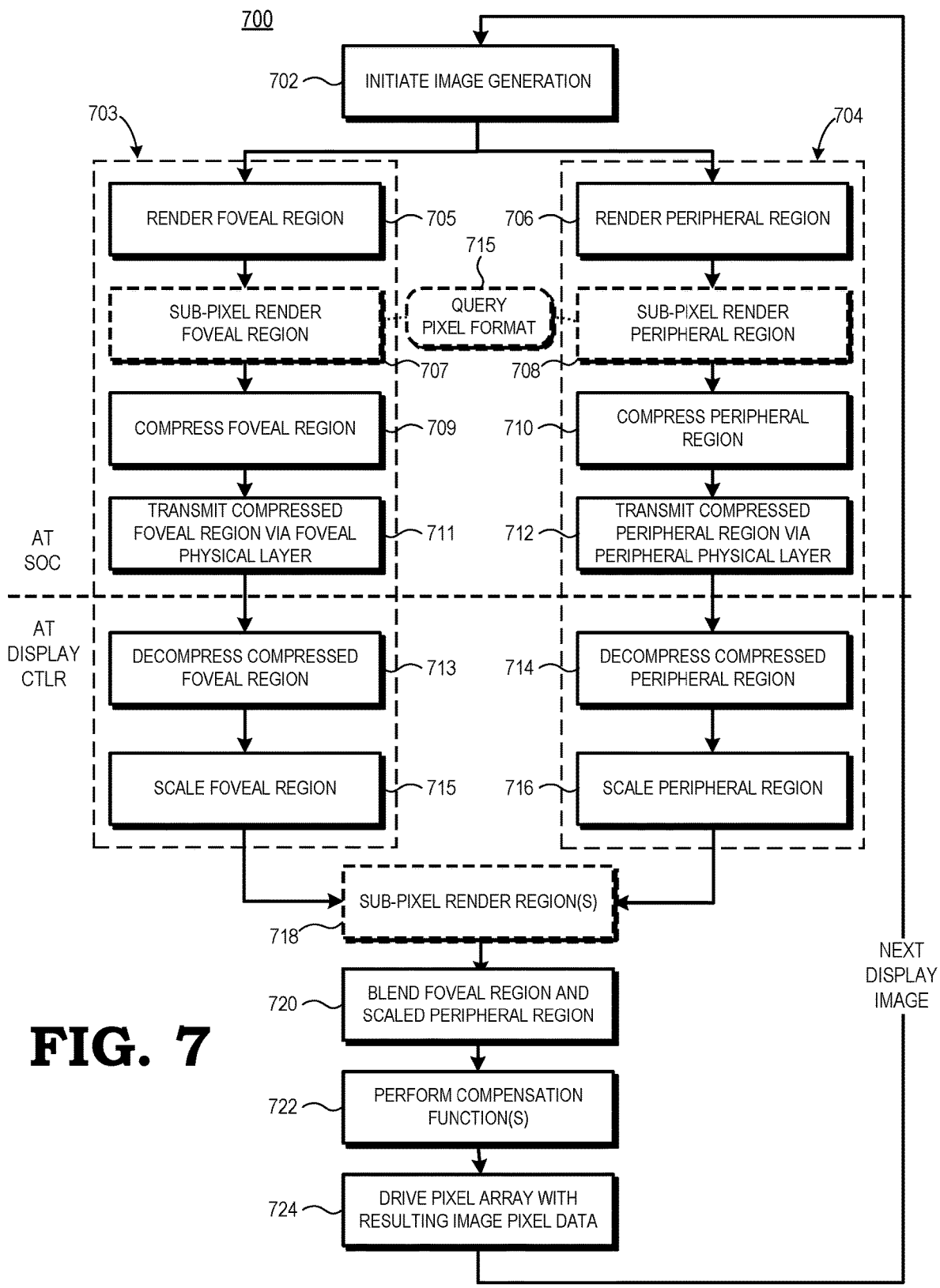
FIG. 7 is a flow diagram illustrating a dual-path foveated image rendering and display process in the system of FIG. 6 in accordance with some embodiments.

FIGS. 6 and 7 illustrate example systems and techniques for early sub-pixel rendering (SPR) so as to address these drawbacks. In at least one embodiment, rather than performing sub-pixel rendering at the display device, the rendering device generates a display image in the non-RGB pixel format of the pixel array of the display device and transmits the display image in this non-RGB pixel format without scaling to the display device. The generation of the display image in this format can include, for example, the rendering device natively rendering the display image in the non-RGB pixel format, or the display device may render the display image in an RGB pixel format and then transform the pixel format of the display image from the RGB pixel format to the non-RGB pixel format for transmission to the display device. This results in a reduced amount of pixel data transmitted over the physical layer connecting the rendering device and the display device, as well as reducing the computational effort of the rendering device in the event that the display image is natively rendered in the non-RGB pixel format. Moreover, by generating the display image in the non-RGB pixel format at the display device, the sub-pixels of the pixel array are separately addressable by the rendering device, and thus a developer or user of the display device may configure the SPR algorithm employed by the rendering device to take advantage of this sub-pixel addressability.

Figure 14:
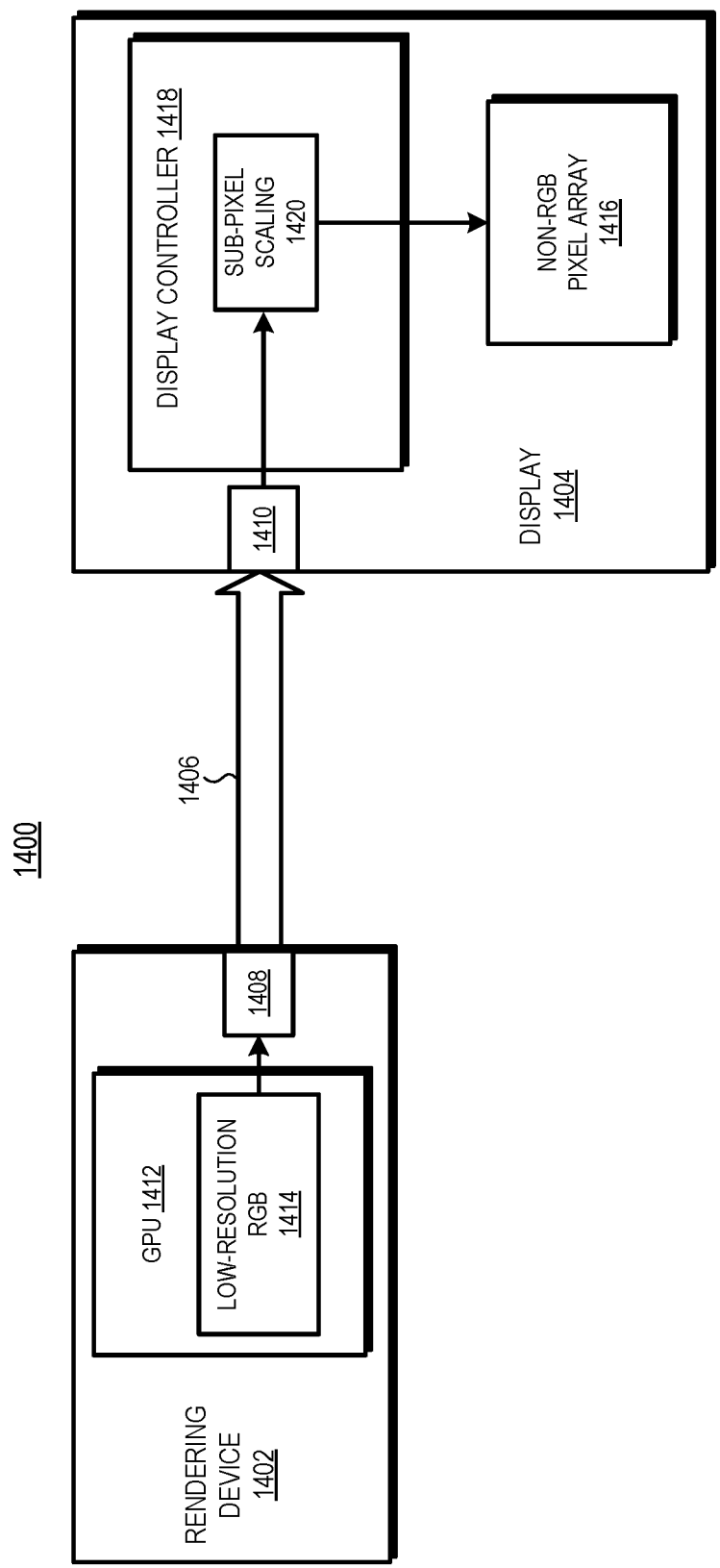
FIG. 14 is a diagram illustrating a display system implementing a low-resolution RGB rendering process in accordance with some embodiments.
Figure 15:
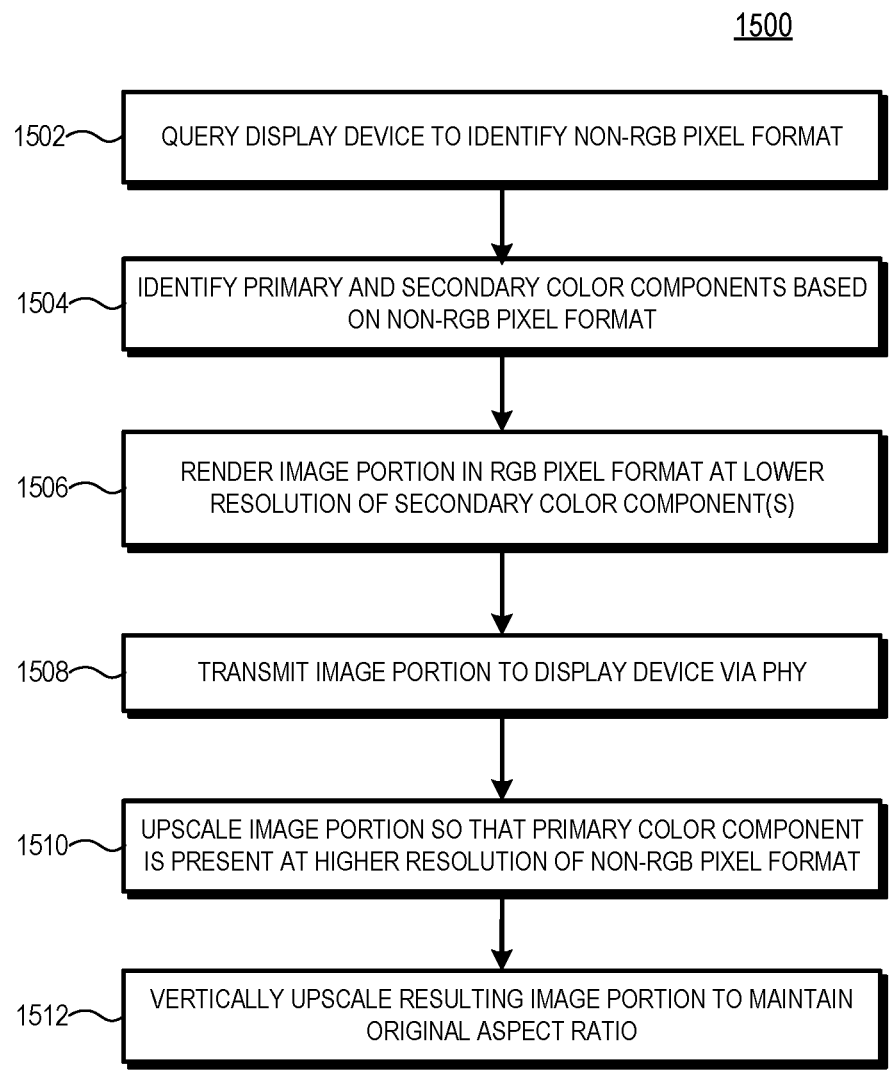
FIG. 15 is a flow diagram illustrating a method for low-resolution RGB rendering in the system of FIG. 14 in accordance with some embodiments.
Figure 16:
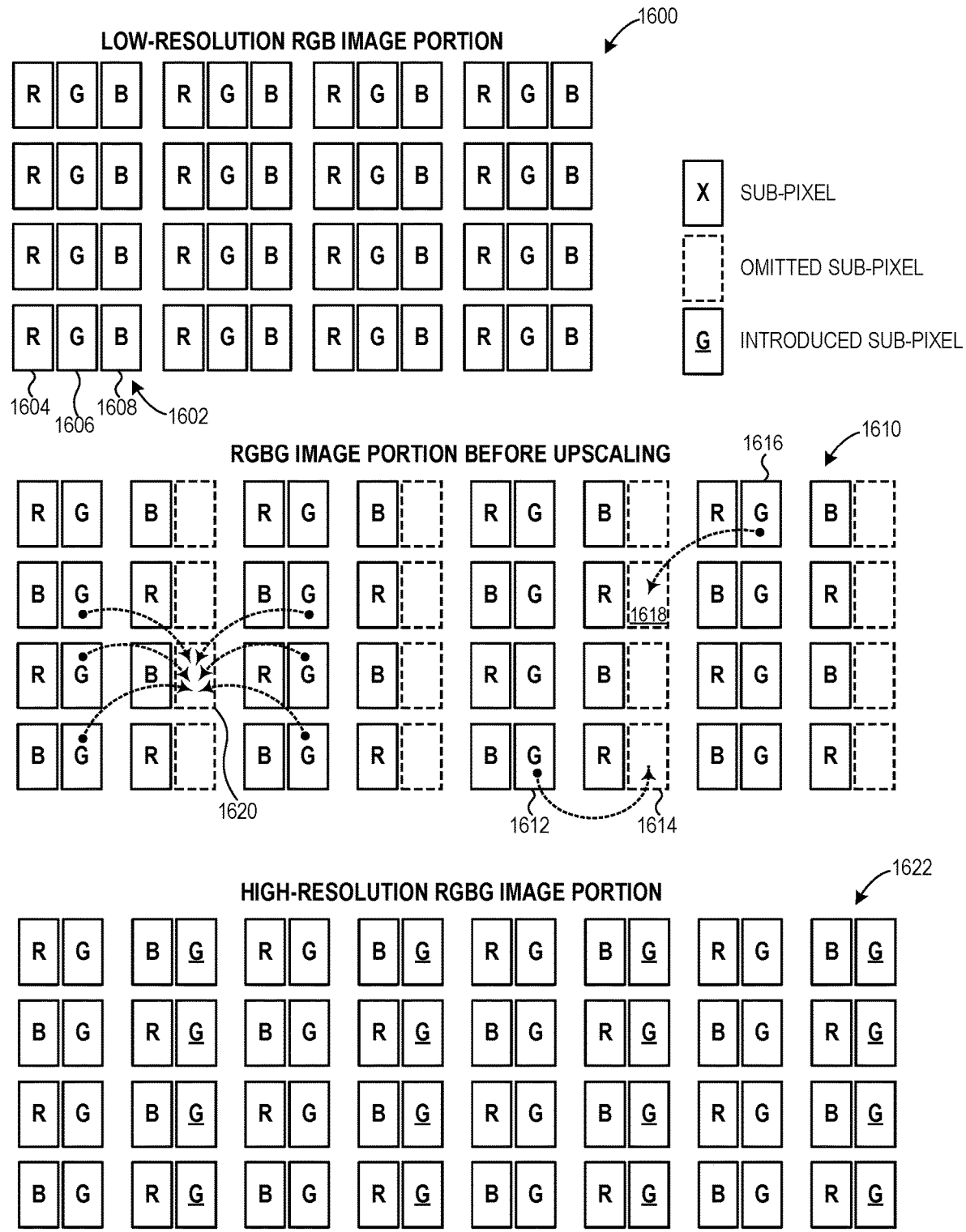
FIG. 16 is a diagram illustrating an example of the low-resolution RGB rendering method of FIG. 15 in accordance with some embodiments.

In many non-RGB pixel formats, one color component occurs at a higher resolution, or frequency, than the other color components of the pixel format. For example, in the RGBG pixel format, the green sub-pixels have a resolution that is twice that of either the red sub-pixels or the blue sub-pixels. This mimics to some degree the ratio of the density of blue and green cones in the retina of the human eye. FIGS. 14-16 illustrate example systems and techniques for reduced-resolution rendering to leverage the different resolutions of the color components of a non-RGB pixel format so as to reduce the computational load to render images and reduce the transmission bandwidth needed to transmit such images to the display device for display. In at least one embodiment, the low-resolution RGB rendering process initially renders an image in an RGB pixel format at the lower resolution of secondary color components in the non-RGB pixel format of the display used to display the image at the display device. This reduces both the rendering computational requirements, as well as results in fewer pixel values to represent the image, and thus requiring a lower transmission bandwidth. At the display device, the image is converted to the non-RGB pixel format, thus permitting the resulting image to be displayed in the compatible pixel format of the pixel array of the display device. As part of this format conversion process, the RGB pixels of the image are upscaled to produce a larger number of output non-RGB subpixels, and thus increasing the resolution of the resulting non-RGB image in the process.

FIG. 1 illustrates an example display system 100 implementing one or more of the image processing techniques described herein in accordance with some embodiments. The display system 100 includes a rendering device 102 coupled to displays 114 and 116 of a display device 104 via at least one physical layer (PHY) 106. The rendering device 102 includes the components of the system 100 implemented to render sequences of images representing AR or VR content for display at the display device 104. The PHY 106 comprises the circuitry and conductive wires or traces utilized to transmit the pixel data representative of the sequence of images from the rendering device 102 to the displays 114 and 116. Examples of the PHY include a Mobile Industry Processor Interface (MIPI-DSI) interconnect, DisplayPort or embedded DisplayPort interconnect, a low voltage differential signal (LVDS) interconnect, a proprietary interconnect, and the like.

In the illustrated example, the display device 104 is depicted as a head mounted display (HMD) device, and thus is also referred to herein as HMD device 104. However, the display device 104 may be implemented as another type of device containing one or more displays, such as a television, computer monitor, cellular phone display or other handheld device, and the like. The HMD device 104 is mounted to the head of a user through the use of an apparatus strapped to, or otherwise mounted on, the user's head such that the HMD device 104 is fixedly positioned in proximity to the user's face and thus moves with the user's movements. However, in some circumstances a user may hold a hand-held device up to the user's face and constrain the movement of the hand-held device such that the orientation of the hand-held device to the user's head is relatively fixed even as the user's head moves. In such instances, a hand-held device operated in this manner also may be considered an implementation of the HMD device 104 even though it is not "mounted" via a physical attachment to the user's head.

The HMD device 104 includes a housing 108 having a user-facing surface 110 and an opposing forward-facing surface (not shown), optical eyepiece lenses 118, 120 and a face pad (or gasket) 112 and set of straps or a harness (omitted from FIG. 1 for clarity) to mount the housing 108 on the user's head so that the user faces the surface 110 of the housing 108. In the depicted embodiment, the HMD device 104 is a binocular HMD and thus has a left-eye display panel 114 and a right-eye display panel 116 disposed behind the optical eyepiece lenses 118, 120 (relative to the user's eyes). In other embodiments, the HMD device 104 implements a single display panel, which is logically divided into a left-eye region for displaying imagery to the left eye and a right-eye region for display for displaying imagery to the right eye. The housing 108 further includes an eyepiece lens assembly 118 aligned with the left-eye display panel 114 and an eyepiece lens assembly 120 aligned with the right-eye display panel 116. Although illustrated as a single lens, each of the eyepiece lens assemblies 118, 120 may comprise two or more lenses and other optical elements.

In some implementations, the HMD device 104 is tethered via one or more PHYs 106 to a desktop computer, notebook computer, or other external processing system that renders the image data and transmits the image data for display at the display panels 114, 116 of the HMD device 104. In such implementations, the external processing system constitutes the rendering device 102, and the PHY(s) 106 constitute the wireless or wired interconnect between the external processing system and the HMD device 104. In other embodiments, the HMD device 104 is a self-contained display system in which the imagery is rendered at the HMD device 104, in which case the rendering device 102 corresponds to the circuitry and other components of the HMD device 104 involved in rendering and other initial processing of the rendered image data. In such implementations, the rendering device 102 is implemented as, for example, one or more systems on a chip (SoCs), application specific integrated circuited (ASICs), and the like. Further, in such implementations, the PHY(s) 106 represent the circuitry and conductive paths coupling the components of the rendering device 102 in the HMD device 104 to the display panels 114, 116 and associated display controllers (shown in FIG. 2) of the HMD device 104.

Figure 2:
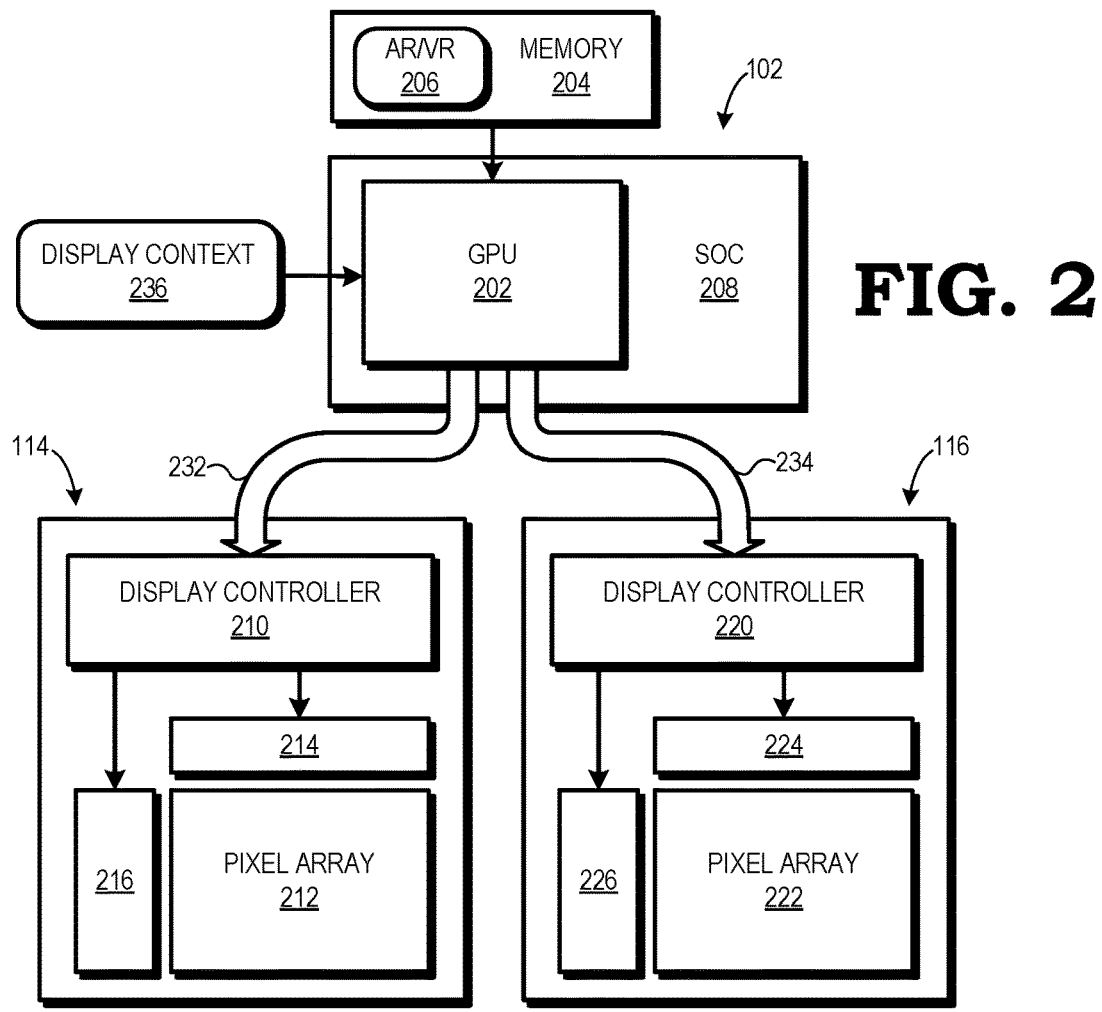
FIG. 2 is a diagram illustrating an image processing system of the foveated display system of FIG. 1 in accordance with some embodiments.

FIG. 2 illustrates an example implementation of the image processing components of the HMD device 104 and rendering device 102 of the system 100 of FIG. 1 in accordance with some embodiments. In the depicted example, the rendering device 102 includes at least one graphics processing unit (GPU) 202 and a system memory 204 storing one or more software applications (singly or collectively referred to herein as "VR/AR software application 206"). The one or more GPUs 202 may be implemented in, for example, a SoC, ASIC, or other device hardware component 208. Although the system memory 204 is illustrated separate from the hardware component 208, in some embodiments the system memory 204 is implemented as memory embedded in the hardware component 208.

The left-eye display panel 114 of the HMD device 104 includes a display controller 210 and a pixel array 212 implementing an array of pixels arranged in rows and columns. Each pixel of the pixel array 212 may be implemented as a matrix of sub-pixels, such as a particular arrangement of red, green, or blue sub-pixels, each of which is controlled to emit light of the corresponding color at a corresponding luminance, and the combination of light colors and their luminance results in the intended brightness and color for the pixel as a whole. Examples pixel architectures for the pixels can include, for example, light emitting diodes (LEDs) and organic light emitting diodes (OLEDs). The left-eye display panel 114 further includes a column-control component 214 and a row-control component 216. The column-control component 106 includes pixel data buffers, line drivers, and column combination logic that together operate to control the pixels of the pixel array 212 on a column-by-column basis. Similarly, the row-control component 216 includes row select logic and row combination logic that together operate to control the pixels of the pixel array 212 on a row-by-row basis.

The column-control component 214 and row-control component 216 typically are implement as integrated circuitry on the display panel substrate that implements the pixel array 212, but in some implementations may be implemented as separate discrete hardware components. Likewise, the display controller 210 may be implemented as a discrete hardware component, such as one or more ASICs, field programmable gate arrays (FPGA) or other programmable logic devices implemented on a printed circuit board (PCB) or flex circuit, or may be implemented as circuitry integrated with the display panel substrate. The right-eye display panel 116 of the HMD device 104 is similarly configured with a display controller 220, a pixel array 222, a column-control component 224, and a row-control component 226.

The one or more GPUs 202 of the rendering device 102 are connected to the display panel 114 via one or more PHYs 232 and to the display panel 116 via one or more PHYs 234, where the PHYs 232, 234 are embodiments of the PHY 106 of FIG. 1. As similarly noted above, the PHYs 232, 234 include the conductive wires, fiber optic lines or other electrical or optical signal conduction structures used to transmit signals between the hardware component 208 implementing the GPU 202 and the display panels 114, 116, as well as the circuitry implementing the interfaces to these signal conduction structures at both the hardware component 208 and the display panels 114, 116. Standardized examples of such PHYs include, but are not limited to, MIPI-DSI interconnects, DisplayPort or embedded DisplayPort interconnects, LVDS interconnects, and the likes.

As a general operational overview, one or more processors of the rendering device 102, including the one or more GPUs 202, execute the VR/AR software application 206 stored in the system memory 204 to provide VR/AR functionality for a user of the HMD device 104. As part of this process, the VR/AR application 206 manipulates the one or more GPUs 202 to render parallel sequences of images for display at the display panels 114, 116, with the sequences of images representing a VR or AR scene based on provided display context information 236. The display context information 236 can include information representing spatial characteristics of an AR or VR environment and objects contained therein, as well as sensor information regarding the pose of the HMD device 102 relative to the represented environment. As each image of a corresponding sequence is rendered, the rendering device 102 provides the pixel data and corresponding control data for transmission via the corresponding one of the PHYs 232, 234 to the corresponding one of the display panels 114, 116, whereupon the display controller of the corresponding display panel processes the received pixel data and provides the resulting modified pixel data to the column-control component and row-control component so as to drive the pixel array to display the imagery represented by the modified pixel data. The computing power to render these parallel sequences of images can tax the GPU resources of the rendering device, as well as overwhelm the transmission bandwidths of the PHYs 232, 234 or require the use of complex and cost-prohibitive implementations for the PHYs 232, 234. Accordingly, to reduce the computational load and bandwidth requirements for this rendering and transmission process, the rendering device 102 and HMD device/display device 104 can implement one or more of the dual-path foveal rendering techniques, early SPR techniques, or reduced-resolution SPR techniques described herein.

In some embodiments, the display system 100 incorporates a dual-path or multi-path foveated graphics pipeline in which each image to be rendered is spatially partitioned into a foveal region that corresponds to a user's gaze direction with respect to the pixel array (e.g., pixel array 212 or 222) corresponding display panel on which the image is to be displayed, as well as one or more peripheral regions surrounding the foveal region. The foveal region, being centered in the anticipated gaze direction, is rendered at a higher resolution, while the one or more peripheral regions are rendered at lower resolutions, with the resolution of each peripheral region generally decreasing with distance from the foveal region in instances with more than one peripheral region.

Figure 3:
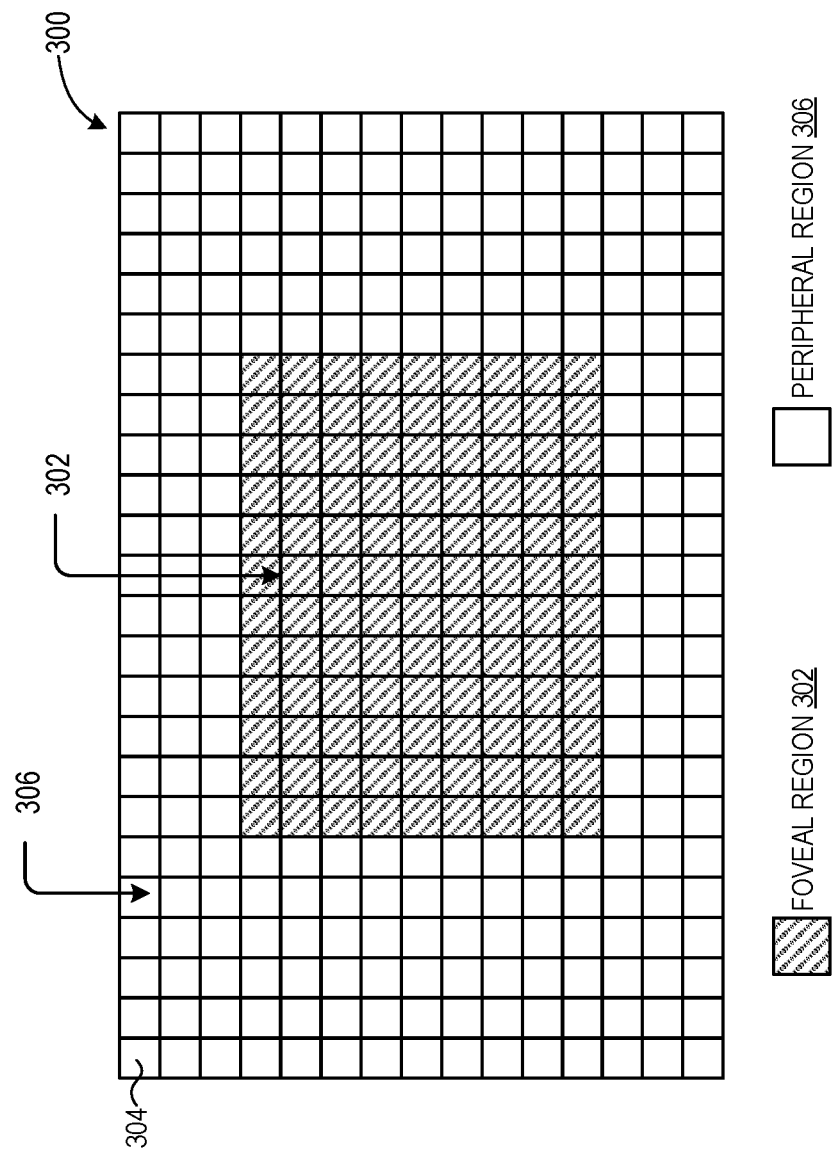
FIG. 3 is a diagram illustrating a foveated image having a foveal region and a single peripheral region in accordance with some embodiments.

In some embodiments, this foveal region has a fixed position within each image of a sequence of images. For example, it may be expected that the user may primarily gaze at the center of the pixel array, and thus the foveal region may be set to a region of pixels centered around this center point of an image, which in turn corresponds to the center point of the pixel array upon which the image is intended to be displayed. To illustrate, FIG. 3 depicts an example pixel array 300 of an image in which a foveal region 302 comprises a subset of pixels 304. For example, the foveal region 302 may comprise a 9×12 subset array of pixels 304 in the illustrated position within the pixel array 300 and a single peripheral region 306 being defined as the remaining subset of pixels 304 of the pixel array 300. It should be noted that, for purposes of illustration, the sizes and resolution of the pixel array and corresponding subset regions are reduced compared to the typical implementation.

Figure 4:
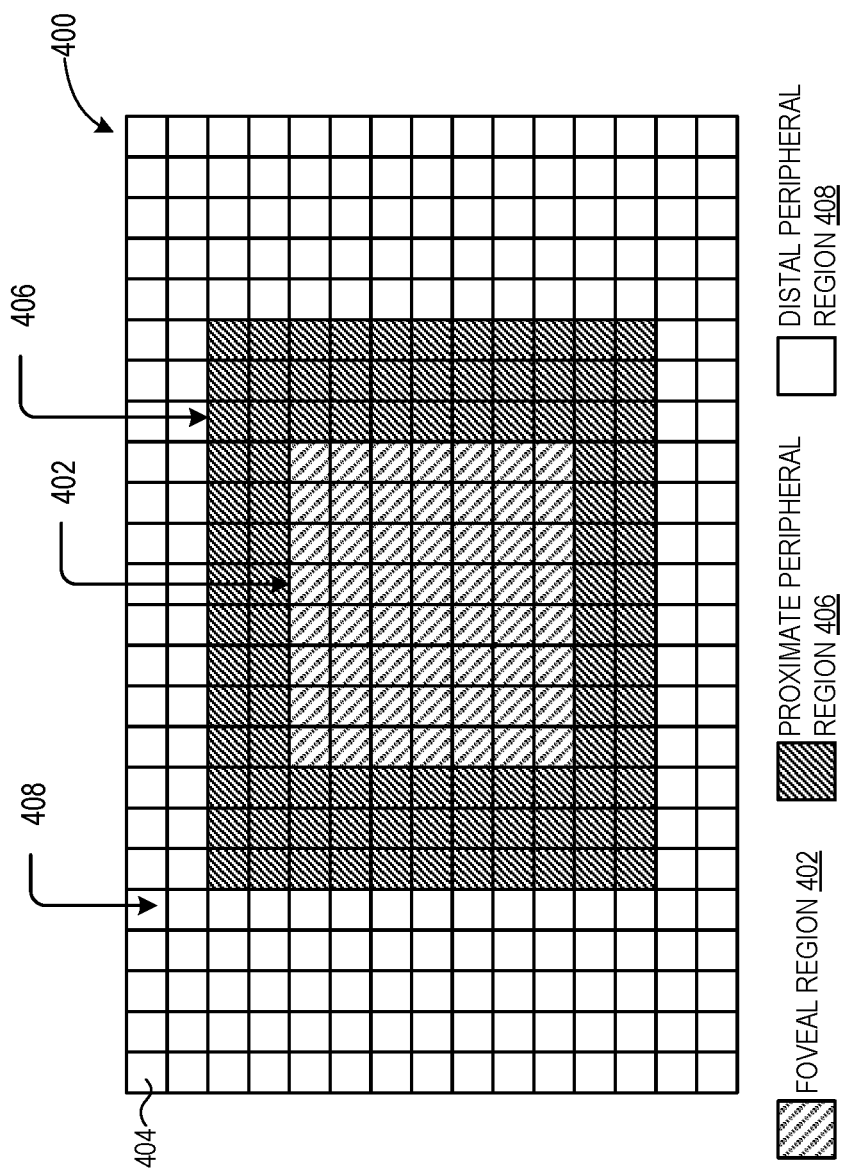
FIG. 4 is a diagram illustrating a foveated image having a foveal region and multiple peripheral regions in accordance with some embodiments.

Although the example of FIG. 3 depicts a single peripheral region 306, in some embodiments the pixels of the pixel array outside of a foveal region may be partitioned into multiple peripheral regions. To illustrate, FIG. 4 depicts an example pixel array 400 of an image in which a foveal region 402 is specified as an 8×7 array subset of pixels 404 in the illustrated position, and the remaining pixels 404 of the pixel array 400 are divided into two concentric peripheral regions: a proximate peripheral region 406 surrounding the foveal region 402 and a distal peripheral region 408 surrounding the proximate peripheral region 406. In instances whereby there are multiple peripheral regions, a display image may be foveally rendered such that the resulting resolution implemented within each peripheral region decreases with the distance from the foveal region.

Figure 5:
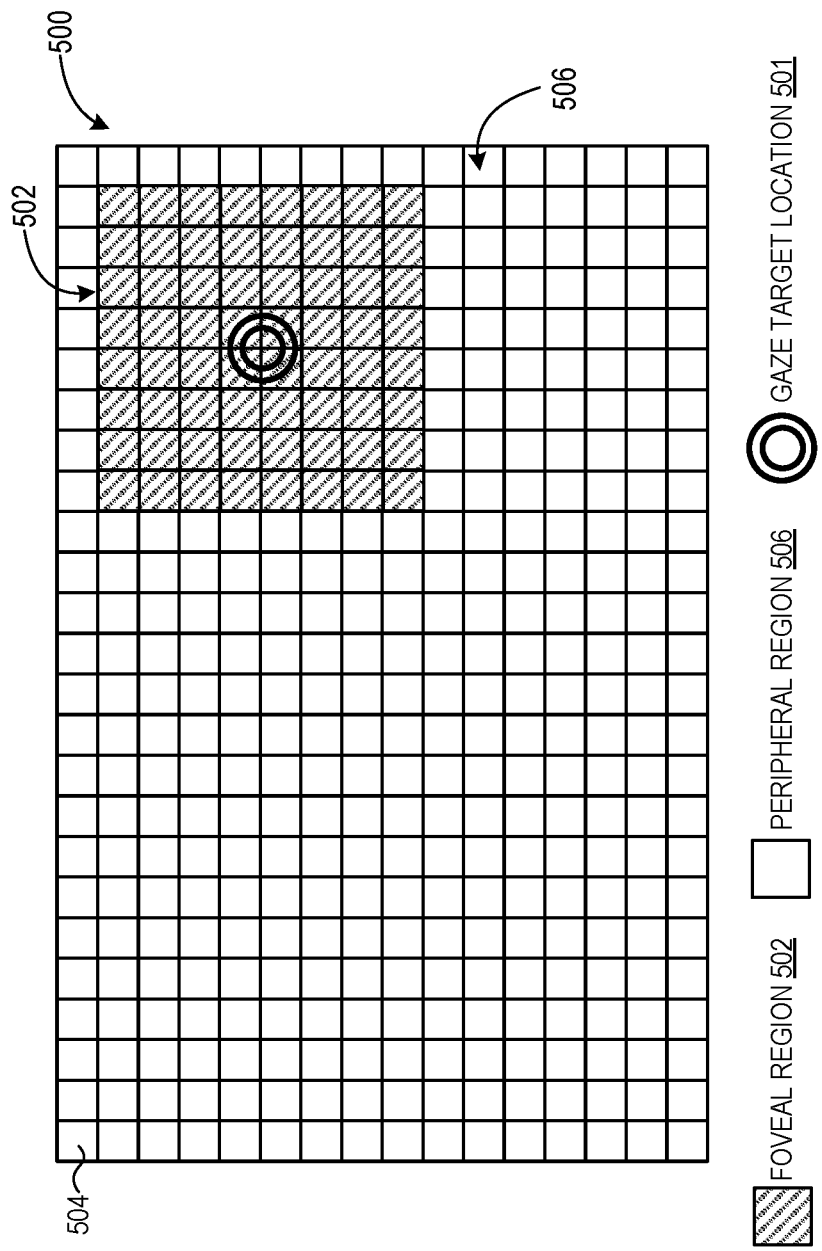
FIG. 5 is a diagram illustrating a foveated image having a dynamically-located foveal region based on eye gaze tracking in accordance with some embodiments.

In other embodiments, the rendering device 102 may employ a gaze tracking system that tracks the gaze direction of one or both of the user's eyes, and from this dynamically updates the location that is the target of the user's gaze in the pixel array of the corresponding display panel (this location being referred to herein as the "gaze target location"), and thus updates the location of the foveal region that is based on the gaze target location. To illustrate, FIG. 5 depicts an example pixel array 500 of an image to be rendered in which a gaze tracking system identifies the user's gaze direction and from this estimates a location 501 in a pixel array of a corresponding display panel as the current gaze target location. On this basis, the rendering system may designate, for example, an 8×8 array subset of pixels 504 centered around this location 501 as a foveal region 502 and designate the remaining pixels 504 as a peripheral region 506 for the image to be rendered. Alternatively, the remaining pixels 504 may be partitioned into more than one peripheral region, as described above with reference to FIG. 4. In this way, the foveal region 502 is projected onto the user's retina with approximate alignment of the foveal region 502 to the user's fovea.

The dimensions of a foveal region (as measured in pixels) may be based on a number of factors, including the overall resolution of the corresponding pixel array of the display panel, the number of different peripheral regions to be implemented, the distance between the display panel and the user's eye, the presence of any lenses or other optical systems between the pixel array and the user's eye and their effect on the user's perception of the display, and the like. To illustrate, assuming that foveal vision occurs inside an area +/−5 degrees horizontal and +/−5 degrees vertical of the optical axis of the eye, a foveal region may be dimensioned to cover this foveal field of view, and further may include some additional margin. In implementations utilizing gaze tracking to dynamically select a position of the foveal region, the amount of margin to be included may be based on the potential error in estimating the gaze direction of the eye. To illustrate, for the example of FIG. 5, it may be assumed that a region of 6×6 pixels represents the foveal field of view, and there is a margin of error in gaze tracking in the horizontal direction that is compensated for by adding two columns of pixels and two rows of pixels on the sides of the 6×6 region (assume negligible vertical eye tracking error in this example), and thus resulting in the example foveal region 502 dimensioned at 8 pixels×8 pixels. It should be noted that the foregoing illustrations are simplified for ease of description. In a typical implementation, a foveal region of +/−5 degrees in horizontal and vertical directions, with an acuity of 1 min of arc per pixel, would require 60 pixels per degree so that the total size of the foveal area would be 600×600 pixels.

With the location and dimensions of a foveal region identified (as well as the location and dimensions of the one or more peripheral regions identified as a result), the display system 100 renders the next display image using a foveal rendering process that renders the resulting display image with higher resolution within the region corresponding to the foveal region and lower resolution(s) with the one or more peripheral region(s). In a conventional foveal rendering process utilized for displaying imagery on a conventional display, the resulting rendered image has a separate pixel data for each pixel of the display. The computational load savings in such conventional foveal rendering processes come from the fact that in the peripheral region rather than having to calculate a unique value for each pixel, many pixel values may be duplicated, interpolated or otherwise approximated from nearby pixels—this process is sometimes referred to as "up-scaling." However, while this duplication or approximation of pixel values for pixels in peripheral regions reduces the number of rendering computations, it still results in a full table of pixel values, and thus the amount of pixel data transmitted to a display, rendered using a conventional foveal rendering process, is the same as the amount of pixel data transmitted to a display without foveal rendering, for the same given display resolution.

FIGS. 6-16 illustrate example implementations and operations of the display system 100 that utilize a foveated graphics pipeline that provides one data path for processing the foveal region and at least one other separate data path for processing one or more peripheral regions. Through this dual-path (or, more generally, multi-path) approach, each peripheral region may be transmitted over a corresponding PHY in its reduced-resolution form, rather than requiring upscaling of the peripheral region prior to transmission. Further, this approach enables a flexible allocation of pixel and image processing tasks between the rendering device 102 and the display device 104, thereby facilitating consideration of bandwidth, power, and capacity considerations.

Referring to FIG. 6, a display system 600 (one embodiment of display system 100) implementing a foveated graphics pipeline is illustrated in accordance with one embodiment. The display system 600 includes a rendering device 602 (one embodiment of rendering device 102) and a display device 604 (one embodiment of display device 104). The rendering device 602 includes an SoC 605 or other hardware component comprising at least one GPU 606 and further including, in some implementations, a compression component 608, which may be implemented entirely in hardware (e.g., as an ASIC or FPGA), as the GPU 606 or other processor executing software representing the functionality described herein, or a combination thereof. The display device 604 includes at least one display panel, with each display panel comprising a display controller 610 coupled to a pixel array 612 via column-control component 614 and a row-control component 616. The display controller 610 can be implemented entirely in hardware, as one or more processors executing software, or a combination thereof.

In instances wherein the display system 600 utilizes a foveal region that tracks the user's gaze, the display system 600 further may include a gaze tracking system 618 that periodically performs a suitable gaze tracking process to determine the current gaze direction 619 of the user's eyes and provides a representation of the current gaze direction 619 to the GPU 606 (e.g., by storing one or more values representative of the current gaze direction 619 to a register or other storage location accessible by the GPU 606) for use in determining the position of the foveal region in the next display image to be rendered. To this end, the gaze tracking system 618 may utilize any of a variety of well-known gaze tracking techniques.

In at least one embodiment, the display system 600 implements dual data paths for the rendering, transmission, and pre-display processing of a sequence of images to be displayed at the pixel array 612. One of the two data paths is a foveal data path 620 implemented as a foveal rendering process 624 executed at the GPU 606, a foveal compression process 626 performed at the compression component 608, physical interfaces 628, 630 at opposing ends of a PHY 632, and a foveal decompression process 634 performed at the display controller 610 of the display device 604 (and in some embodiments may further include an upscaling process). The other data path is a peripheral data path 622 implemented as a peripheral rendering process 636 executed at the GPU 606, a peripheral compression process 638 performed at the compression component 608, physical interfaces 640, 642 at opposing ends of a PHY 644, and a peripheral decompression process 646 and scaling process 648 performed at the display controller 610 of the display device 604.

As described in greater detail herein, for each image of a sequence of images to be displayed at the display device 604, the foveal data path 620 renders a foveal region for the display image, compresses the foveal region for transmission via the PHY 632 to the display controller 610, whereupon the compressed foveal region is decompressed. In parallel, the peripheral data path 622 renders a peripheral region for the display image at the lower resolution determined for the peripheral region, compresses the peripheral region for transmission via the PHY 644 to the display controller 610, whereupon the display controller 610 decompresses the compressed peripheral region, and upscales the decompressed peripheral region so as to be compatible with the decompressed foveal region. In some embodiments, the display controller 610 also upscales the decompressed foveal region in a similar manner. The display controller 610 then performs a blending process 650 to blend the decompressed foveal region and upscaled peripheral region to generate a modified image representative of the image as rendered by the GPU 606. The display controller 610 then may perform one or more additional pre-display processes for this modified image, such as a distortion correction process 652 followed by a compensation process 654, before the pixel data of the resulting image is provided to the controllers 614, 616 for use in driving the pixel array 612 to display the image.

In some implementations, the display system 600 utilizes physically distinct PHYs for each of the data paths 620, 622. That is, the PHY 632 implemented for the foveal data path 620 is a different PHY than the PHY 644 implemented for the peripheral data path 622. In other embodiments, the PHYs 632, 644 are the same PHY shared by the data paths 620, 622 using, for example, time multiplexing, contention techniques and the like. The utilization of the PHYs 632, 644 is described in greater detail below with reference to FIGS. 10 and 11.

As noted, rather than implement a conventional RGB pixel format in which one red sub-pixel, one blue sub-pixel, and one green sub-pixel are striped or otherwise arranged as a single pixel, the pixel array 612 may implement a non-RGB pixel format, such as the aforementioned RGBG pixel format, wherein each pixel has only two sub-pixels, with half of the pixels having one red sub-pixel and one green sub-pixel and the other half of the pixels having one blue sub-pixel and one green subpixel. The conventional approach is to transmit image data in the RGB pixel format to the display panel, whereupon the display panel converts each RGB pixel to a non-RGB pixel in accordance with an algorithm implemented by the display manufacturer to perform the necessary conversion format from RGB to non-RGB for the pixel data so that it may be displayed by the pixel array of the display panel. In some embodiments wherein the pixel array 612 implements a non-RGB pixel format, the display system 600 may implement this conventional approach, such as by employing a sub-pixel rendering process 656 at the display controller 610 to convert the image data resulting from the compensation process 654 from the RGB pixel format to the non-RGB pixel format implemented by the pixel array 612.

However, the conventional sub-pixel rendering approach limits the flexibility of the system in that the pixel format conversion algorithm is fixed and difficult to modify or replace with an alternate algorithm. Further, an image having the RGB pixel format typically is represented by more pixel data than an image having a non-RGB pixel format. To illustrate, assuming each sub-pixel is represented by 8 bits, each pixel in an RGB pixel format has three sub-pixels and thus requires 24 bits, whereas each pixel in the RGBG format has two sub-pixels and thus requires only 16 bits. In at least one embodiment, the display system 600 leverages the lower data requirements of the RGBG format by shifting the sub-pixel rendering process to a point earlier in the foveated graphics pipeline. In particular, when the pixel array 612 implements a non-RGB pixel format, in some embodiments the foveal data path 620 implements a foveal sub-pixel rendering process 660 executed at the GPU 606 so as to generate the foveal region with the non-RGB pixel format, while the peripheral data path 622 implements a peripheral sub-pixel rendering process 662 executed at the GPU 606 so as to generate the peripheral region with the non-RGB pixel format. The foveal and peripheral regions in the non-RGB pixel format may then be compressed and transmitted over the PHYs 632, 634 as described herein. However, by performing the SPR process early in the data paths 620, 622, the amount of pixel data required for transmission over the PHYs 632, 644 is reduced compared to the same image represented in an RGB pixel format, and thus enabling use of PHYs with lower complexity or lower power consumption due to a corresponding reduction in the clocks of the PHYs.

The parallel processing performed by data paths 620, 622 may be achieved through the use of two separate components that operate in parallel, the interleaving of processing tasks at the same component, or a combination thereof. For example, the foveal rendering process 624 may be performed by one GPU 606 while another GPU 606 performs the peripheral rendering process 636 in parallel, or one GPU 606 may be used to perform both rendering processes 624, 636, whereby the GPU 606 interleaves or stutters between rendering one or more pixel rows for the foveal region and then rendering one or more pixel rows for the peripheral region, and so forth.

FIG. 7 illustrates and example method 700 of operation of the display system 600 for dual data path processing of a foveated display image in accordance with some embodiments. The method 700 begins at block 702 with the GPU 606 initiating the generation of a display image for a sequence of images. The GPU 606 may receive draw instructions and other contextual information describing the image to be rendered, including a representation of a current pose of an HMD device implementing the display device 604, a description of the AR or VR environment as viewed from this pose, a description of objects within the environment, and the like. In embodiments utilizing gaze tracking for foveation purposes, the GPU 606 further may receive the current gaze direction 619 from the gaze tracking system 618 and from this information determine a position of a foveal region and one or more peripheral regions in the display image to be generated. With the draw instructions for an image received and the positions of the foveal region and one or more peripheral regions identified (if the foveal region can be dynamically repositioned), the display system 600 triggers parallel rendering and processing of the regions of the display image via paths 703 and 704 of method 700, with path 703 representing the operation of the foveal data path 620 and path 704 representing the operation of the peripheral data path 622 for a single peripheral region in this example.

At block 705 of path 703, the GPU 606 performs the foveal rendering process 624 to render a foveal region for the display image in accordance with the draw instructions and other draw information received at block 702. Concurrently, at block 706 of path 704 the GPU 606 performs the peripheral rendering process 636 to render the peripheral region for the display image. As explained above, the foveal region is rendered at a higher resolution (e.g., the resolution of the pixel array 612), whereas the peripheral region is rendered at a lower resolution (e.g., at one-half, one-fourth, or one-tenth of the resolution of the pixel array 612). The rendering processes 624, 636 may include not only the generation of the regions of the corresponding image, but further include various initial correction to the image, such as processes for performing corrections for lateral chromatic aberration and distortion that are anticipated to be introduced by the pixel array 612 and any optical elements used to view the pixel array 612.

In embodiments implementing early sub-pixel rendering, at block 707 of path 703 the GPU 606 performs the foveal sub-rendering process 660 to generate the foveal region with the non-RGB pixel format of the pixel array 612, while at block 708 of path 704 the GPU 606 performs the peripheral sub-rendering process 662 to generate the peripheral region with the non-RGB pixel format. In some embodiments, the regions are natively rendered in the non-RGB pixel format (that is originally rendered in the non-RGB pixel format directly from the draw instructions received by the GPU 606 to initiate rendering of the display image). In such instances, the sub-pixel rendering processes 660, 662 are considered to be implementations of the rendering processes 624, 636, respectively, and thus the processes of blocks 705 and 707 are the same process and the processes of blocks 706 and 708 are the same process. In other embodiments, the foveal and peripheral regions are first rendered in the RGB pixel format, and then the pixel formats of the foveal and peripheral regions are transformed into the non-RGB pixel format using an appropriate pixel format transform algorithm. In such instances, the sub-pixel rendering processes 660, 662 may be considered processes that are separate from the rendering processes of blocks 705, 706.

As the rendering device 602 may be connected to any of a variety of display devices 604 with one of a variety of non-RGB pixel formats, the rendering device 602 may not have a priori knowledge of the particular non-RGB pixel format of the pixel array 612. Accordingly, to determine the non-RGB pixel format employed by the pixel array 612 for use in the sub-rendering processes of blocks 707 and 708, in one embodiment the rendering device 602 queries, at block 715, the display device 604 for an indicator of the non-RGB pixel format employed by the display device 604, or otherwise obtains this indicator from the display device 604. To illustrate, the rendering device 602 may transmit the query and receive the indicator in response via a control channel implemented in one or both of the PHYs 632, 644 or as parameters embedded in a header or other field of a pixel stream. Alternatively, the rendering device 602 and the display device 604 may communicate this indicator via a separate side band channel.

At block 709 of path 703, the compression component 608 performs the foveal compression process 626 so as to compress the foveal region to generate a compressed foveal region, while at block 710 of path 704, the compression component 608 performs the peripheral compression process 638 so as to compress the peripheral region to generate a compressed peripheral region. Any of a variety of compression algorithms, such as Display Stream Compression, or combinations of compression algorithms can be employed for compression processes 626, 638. Further, the foveal compression process 626 may employ a different compression algorithm than the peripheral compression process 638. As an example, because a high-resolution, high-fidelity foveal region is more likely to lead to a satisfactory user experience than a high-resolution, high-fidelity peripheral region, the foveal compression process 626 may employ a lossless compression algorithm, whereas the peripheral compression process 638 may employ a lossy compression algorithm as some loss of image information in the peripheral region may be an acceptable tradeoff for the improved efficiency of the lossy compression algorithm. Moreover, in the event that early SPR is implemented (via blocks 707, 708), in some embodiments the SPR process 660 and foveal compression process 626 are combined or implemented as the same operation; likewise, the SPR process 662 and peripheral compression process 6238 are combined or implemented as the same operation, which may provide certain optimizations when the logic implementing these processes is combined.

At block 711 of path 703, pixel data representing the resulting compressed foveal region is streamed to the interface 628 for transmission to the display device 604 via the PHY 632, while at block 712 of path 703, pixel data representing the resulting compressed peripheral region is streamed to the interface 640 for transmission to the display device 604 via the PHY 640. The compression afforded by the compression processes 626, 638 results in a reduced bandwidth requirement for transmitting the regions of the display image. Further, in embodiments employing early sub-pixel rendering, the reduction in pixel values required to represent the display image further reduces the bandwidth requirements for transmitting the regions of the display images over the PHYs 632, 640. This allows either or both of less complex implementations of the PHYs 632, 640 and implementations of the PHYs 632, 640 that consume less power due to the lower clocking requirements needed to transmit data at the lower data rate.

As the pixel data for the compressed foveal and peripheral regions is received at the display controller 610, at block 713 of path 703 the display controller 610 performs the foveal decompression process 634 to decompress the compressed foveal region, while at block 714 of path 704 the display controller 610 performs the peripheral decompression process 646 to decompress the compressed peripheral region.

As one or both of the peripheral region or the foveal region was rendered at a lower resolution than the resolution of the pixel array 612 and the foveal region, it typically is useful to upscale the lower-resolution region(s) to the higher resolution of the pixel array before performing any processes that utilize the foveal region and the peripheral region jointly. As noted, in conventional display systems, this upscaling is performed at the rendering device before transmitting the image to the display device, and thus resulting in a larger amount of data for transmission over the PHY connecting the rendering device and the display device. In contrast, in the method 700, the rendering device transmits the peripheral region (and in some embodiments, the foveal region) without upscaling (that is, in its original lower-resolution form) from to the display device 604, and thereby necessitating a lower bandwidth for transmission. Accordingly, to prepare the received, decompressed peripheral region for further processing, at block 716 of path 704, the display controller 610 performs the scaling process 648 to upscale the peripheral region to the higher resolution of the foveal region or the pixel array 612. Likewise, if the foveal region was rendered at a lower resolution, to prepare the received, decompressed peripheral region for further processing, at block 715 of path 703, the display controller 610 performs a scaling process to upscale the foveal region to the higher resolution. As part of the transmission process for the peripheral region, the rendering device 602 may provide size information that indicates the intended size of the peripheral region and the location of the foveal region. This size information may be embedded in the data stream for the peripheral region (e.g., as one or more headers or during a vertical blanking interval or horizontal blanking interval) or may be provided between the rendering device 602 and the display device 604 via a separate side-band channel. With this size information, the scaling process 648 may implement any of a variety of well-known upscaling techniques for upscaling the peripheral region. For example, the upscaling may be implemented using one or more of a pixelreplication-based process, a pixel-interpolation-based process, or a motion-prediction-based process.

With the peripheral region upscaled to the higher resolution, at block 720 the display controller 610 performs the blending process 650 to spatially and temporally blend the foveal region and peripheral region at the edges of the foveal region to generate a modified representation of the original image generated at the rendering device 602. If the pixel array 612 implements a non-RGB pixel format and if early SPR was not implemented at the rendering device 602, at block 718 the display controller 610 performs SPR processes 656, 658 (FIG. 6) to convert the RGB pixel format of the foveated region and peripheral region (after upscaling) to the non-RGB format before the blending process 650 represented by block 720. Alternatively, an SPR process may be performed after the blending process to convert the pixel format of the modified representation of the original image from an RGB format to the non-RGB format. Otherwise, if the pixel array 612 employs an RGB pixel format or early SPR was implemented, the process of block 718 may be skipped. At block 722, the display controller 610 performs one or more compensation processes 654 on the modified image. Such compensation processes 654 can include, for example, an optical distortion correction process, such as a gamma color correction process, a correction process to improve the uniformity for an OLED-based pixel array 612, or a correction process to linearize the liquid crystal response for an LCD-based pixel array 612. Further, the compensation process 654 is illustrated as being performed at the display controller 610, in other embodiments one or more compensation processes 654 may instead be implemented earlier in the pipeline at the GPU 606.

After blending and correction, the resulting image is ready for display at the pixel array 612. Accordingly, at block 724 the display controller drives the pixel array 612 to display the resulting image by sequentially reading rows of pixel data of the resulting image into a row buffer (not shown) of the column-control component 614 and controlling the row-control component 616 and column-control component 614 in accordance with corresponding display timing clocks to illuminate the pixels of the pixel array 612 at the corresponding row in accordance with the buffered row of pixel data as well-known in the art. The process of method 700 is repeated for each image of the sequence of images, and two parallel instances of method 700 are performed in HMD-based display systems or other dual-display based systems, thereby presenting stereoscopic imagery representative of an AR or VR scene to a user.

As explained above, the foveal PHY 632 and the peripheral PHY 644 may be implemented as separate PHYs or together as a single PHY. The use of separate PHYs has the advantage of transmitting only a portion of the pixel data of an image over any one PHY, and thus lower-power or lower-complexity PHYs may be implemented, but at the cost of employing multiple PHYs to transmit a sequence of images to the display device 604. In contrast, use of a single PHY avoids the complexity of implementing multiple PHYs for the transmission of the image sequence, but because the foveal region and peripheral regions are of different vertical resolutions combined transmission of a foveal region and one or more peripheral regions simply through appending the one or more peripheral regions to the foveal region often is incompatible with conventional PHY protocol, as such protocols expect each row of the image being transmitted to be of the same length. FIGS. 8-13 illustrate example techniques for combining pixel streams for a foveal region and one or more peripheral regions into a combined pixel stream compatible with the fixed-row-length requirements of many conventional PHY implementations.

Figure 8:
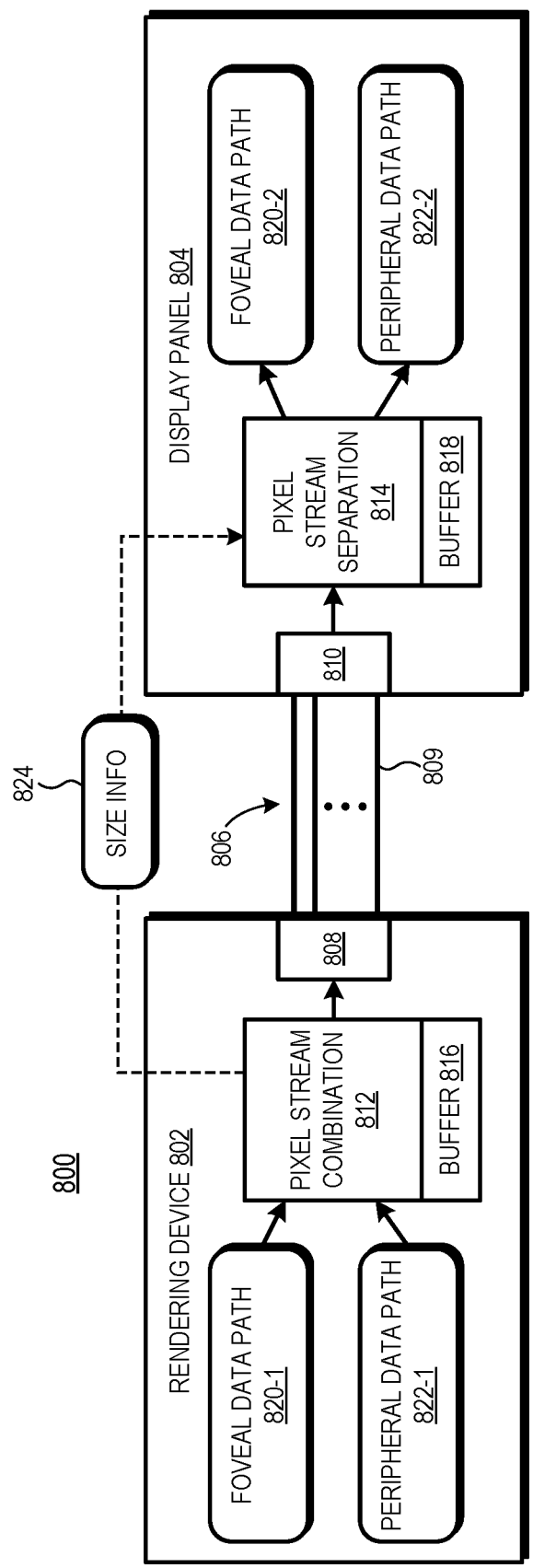
FIG. 8 is a diagram illustrating a display system utilizing a single physical layer to transmit an image having a foveal region and at least one peripheral region in accordance with some embodiments.

Turning to FIG. 8, a display system 800 (one embodiment of display system 600) having a rendering device 802 (one embodiment of rendering device 602) coupled to a display device 804 (one embodiment of display device 604) via a single PHY 806 is depicted. As shown, the PHY 806 includes a set 809 of wires or other signal conductors connected to an interface 808 at one end and an interface 810 at the other end. The PHY 806 implements a signaling protocol that expects or mandates that any transmitted pixel array has rows of constant width. Connected to the interface 808 at the rendering device 802 is a pixel stream combination component 812 having a buffer 816, while the interface 810 is connected to a pixel stream separation component 814 having a buffer 818 at the display device 804. The components 812, 814 may be implemented as hardcoded logic, one or more processors executing software, or a combination thereof.

In operation, the illustrated foveal data path portion 820-1 (representing the portion of the foveal data path 620 implemented at the rendering device 602) streams pixel data representing the foveal region of an image being generated for display to the pixel stream combination component 812, and the peripheral data path portion 822-1 (representing the portion of the peripheral data path 622 implemented at the rendering device 602) stream pixel data representing the peripheral region of the image to the pixel stream combination component 812. The pixel stream combination component 812 buffers these pixel streams in the buffer 816 as they are being received. The pixel stream combination component 812 then combines each row of the pixel array of the image region that has the higher vertical resolution (designated herein as the "base region" for ease of reference) with a set number of pixels from one or more rows of the pixel array each image region having a lower vertical resolution (designated herein as a "non-base region") to generate a corresponding row a combined pixel array such that each row of the combined pixel array has the same number of pixels, and thus is suitable for transmission over the PHY 806. As part of this process, the pixel stream combination component 812 determines the number of pixels from a non-base region to append to a corresponding row of pixels of the base image, this number being referred to as the "partition count" for the non-base region. A partition count is determined for each non-base image region.

At the display device 804, the pixel stream separation component 814 receives the data stream representing this combined pixel array and buffers the data stream in the buffer 818 as its received. The pixel stream separator component 814 then uses size information 824 received from the pixel stream combination component 812 (and indicating the horizontal and vertical resolutions of the image regions) to partition the combined pixel array into the reconstituted base image region and the one or more non-base regions. The image region constituting the foveal region is then provided to the illustrated foveal data path portion 820-2 (which represents the portion of the foveal data path 620 at the display device) and the image region(s) constituting the one or more peripheral regions are then provided to the illustrated peripheral data path portion 822-2 (which represents the portion of the peripheral data path 622 at the display device) for further processing, as described above.

The image region combination technique employed by the pixel stream combination component 812 may be better understood with reference to FIGS. 9 and 10. In diagram 900 of FIG. 9, a base image region 902 (which in this example is the foveal region) is shown adjacent to a single non-base image region 904 (which in this example is the peripheral region), with the horizontal and vertical dimensions of the boxes representing regions 902, 904 are representative of the relative horizontal and vertical resolutions of the regions 902, 904. If an attempt to transmit both regions 902, 904 over the PHY 806 were made simply by appending each row of the non-base image region 904 to a corresponding row of the base image region 902, protocol issues could arise as the set 906 of rows of the base image region 902 would have no corresponding row from the non-base image region 904 to append, and thus the transmission of regions 902, 904 would result in transmission of pixel rows of two different lengths.

As illustrated by diagram 901, the particular technique employed by the pixel stream combination component 812 provides combined rows of uniform length by, in effect, reshaping the non-base region 904 into a reshaped non-base region 908 that effectively has the same vertical resolution as the base image region 902 (and a correspondingly reduced horizontal resolution so that the pixel count of the non-base region 904 remains constant). Thus, each row of the base image region 902 has a corresponding row in the reshaped non-based region 908, and thus the appending of these pairs of rows results in a combined pixel array 910 in which each row is of the same width, and thus facilitating efficient transmission of the combined pixel array 910 via the PHY 806.

As illustrated by FIG. 10, the image region reshaping and combination process is similarly implemented for implementations whereby an image is partitioned into a foveal region and multiple peripheral regions. As shown by diagram 1000, an image may be foveally rendered so as to result in a base image region 1002 and non-base regions 1003 and 1004, where the horizontal and vertical dimensions of the boxes representing the regions 1002, 1003, 1004 are representative of the horizontal and vertical resolutions of the regions 1002, 1003, 1004. As shown by diagram 1001, non-base regions 1003, 1004 are reshaped by the pixel stream combination component 812 to have the same vertical resolution as the base image region 1002 with correspondingly reduced horizontal resolutions, resulting in reshaped non-base image regions 1006, 1008. Each row of the base image region 1002 is then combined with a "row" of pixels from the reshaped non-base image region 1006 and with a "row" of pixels from the reshaped non-base image region 1008 to form a corresponding row of the resulting combined pixel array 1010. As each row of the combined pixel array 1010 is of the same width, the combined pixel array 1010 is well suited for transmission via the PHY 806.

Figure 11:
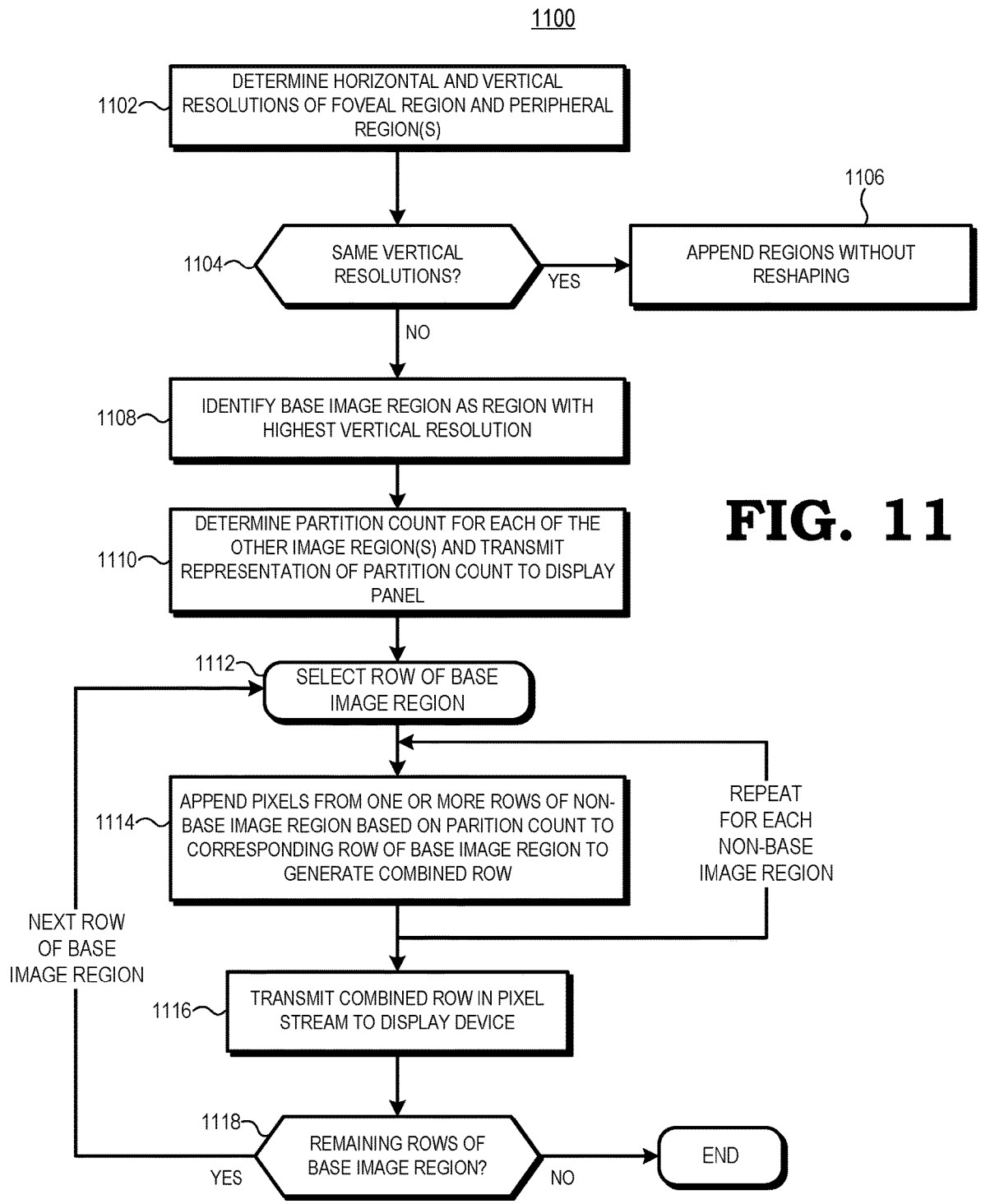
FIG. 11 is a flow diagram illustrating a method for reshaping imager regions of an image into a single combined pixel array with constant-width rows in accordance with some embodiments.

FIG. 11 illustrates an example method 1100 for the reshaping and combining process employed by the pixel stream combination component 812 for combining multiple image regions of disparate vertical resolution into a combined pixel array having a constant row width in accordance with some embodiments. For the following, it is assumed that the frame rate is the same for all image regions. The method 1100 initiates at block 1102 with the pixel stream combination component 812 determining the horizontal and vertical resolutions of each of the image regions of an image rendered by the rendering device 802. These resolutions may be fixed for each image of the sequence of images generated by the rendering device 802, in which case the default settings are used to determine the horizontal and vertical resolutions. In other embodiments, the rendering device 802 may dynamically adjust the resolutions of the regions between images depending on various factors, such as rate of eye movement, rate of movement of motions represented in the images, etc. In such cases, the GPU 606 may communicate the resolution values for each rendered image region to the pixel stream combination component 812.

At block 1104, the pixel stream combination component 812 determines whether each of the image regions has the same vertical resolution. If so, there is no need to reshape any of the image regions, and thus at block 1106 the pixel stream combination component 812 may combine the image regions into a combined pixel array for transmission by combining each row of an image region with the corresponding row of each other image region to generate a corresponding row of the combined pixel array.

However, in the event that the image regions have different vertical resolutions, at block 1108 the pixel stream combination component 812 identifies the image region with the greatest vertical resolution as the "base" image region and identifies the other image region(s) as "non-base regions." Further, the vertical resolution of the base image region is denoted herein as "Vb". At block 1110, the pixel stream combination component 812 identifies a partition count for each non-base region. As explained below, the partition count for a non-base region represents the number of pixels extracted from one or more adjacent rows of the non-base region that are to be appended to a corresponding row of the base image region in forming a combined row for the combined pixel array being constructed and transmitted. The partition count for a non-base region can be determined in accordance with the following expression (EQ. 1):

$$\text{partition\_count} = \left\lceil \frac{Vr \times Hr}{Vb} \right\rceil \qquad \text{EQ. 1}$$

whereby partition_count represents the partition count for the non-base image region, Vr represents the original vertical resolution of the non-base image region, Hr represents the original horizontal resolution of the non-base image region, and Vb represents the vertical resolution of the base image region. Further, the pixel stream combination component 812 transmits indications of the horizontal and vertical resolutions of the image regions as the size information 824 (FIG. 8) to the display device 804

At block 1112, the pixel stream combination component 812 selects the next row of the base image region in the row sequence from the one or more rows buffered in the buffer 816, with row 0 being selected in the first iteration of block 1112. At block 1114, the pixel stream combination component 812 extracts a number of pixels from a non-base region equal to the partition count and appends the extracted pixels to the row of pixels of the base image region selected at the current iteration of block 1112. This extraction and appending process is repeated for each non-base image region in the event that there is more than one non-base image.

As understood from the expression for calculating the partition count defined above, the non-base image region may not be composed of pixels equal to an integer multiple of the partition count. In such cases, there will not be enough remaining pixels from the non-base image region to extract append to the last row, or last few rows, of the combined pixel array. In such instances, the pixel stream combination component 812 may insert a default value for each missing pixel, where this default value may comprise a null value or "don't care" value as the default value will be discarded by the pixel stream separation component 814, as explained below.

After pixels from all of the non-base image regions have been extracted and appended, at block 1116 the resulting combined row of pixels is output by the pixel stream combination component 812 to the interface 808 for transmission to the display device 804 via the PHY 806 as a row of a combined pixel array being generated and transmitted through method 1100. Typically, the transmission of an image or other pixel array via a PHY such as the PHY 806 involves the use of a pixel clock and horizontal blanking intervals to delineate the transmission of each pixel and to delineate the end of each row of pixels being transmitted. Accordingly, the pixel clock for transmitting each combined row of the combined pixel array is set to the sum of the pixel clocks that would otherwise be used to transmit each image region individually. To illustrate, if the rendered image being processed has one foveal region that has a pixel clock CLK_F and one peripheral region having a pixel clock CLK_P, the pixel clock CLK_C for transmitting each row of the combined pixel array would be CLK_C=CLK_K+CLK_P. If the rendered image being processed has one foveal region that has a pixel clock CLK_F and two peripheral regions having pixel clocks CLK_P1 and CLKP2, respectively, the pixel clock CLK_C for transmitting each row of the combined pixel array would be CLK_C=CLK_K+CLK_P1+CLK_P2. For similar reasons, the horizontal sync (Hsync) period and vertical sync (Vsync) period for the combined pixel array for transmission would be set to the Hsync period and Vsync period, respectively, of the base image region.

At block 1118, the pixel stream combination component 812 determines whether all rows of the base image region have been selected and processed. If not, the method 1100 returns to block 1112 for selection of the next row of the base image and the next iteration of blocks 1114 and 1116 for the selected next row. Otherwise, if all rows have been selected, processed and transmitted, the current iteration of method 1100 ends and another iteration begins for the next image in a display sequence.

Figure 12:
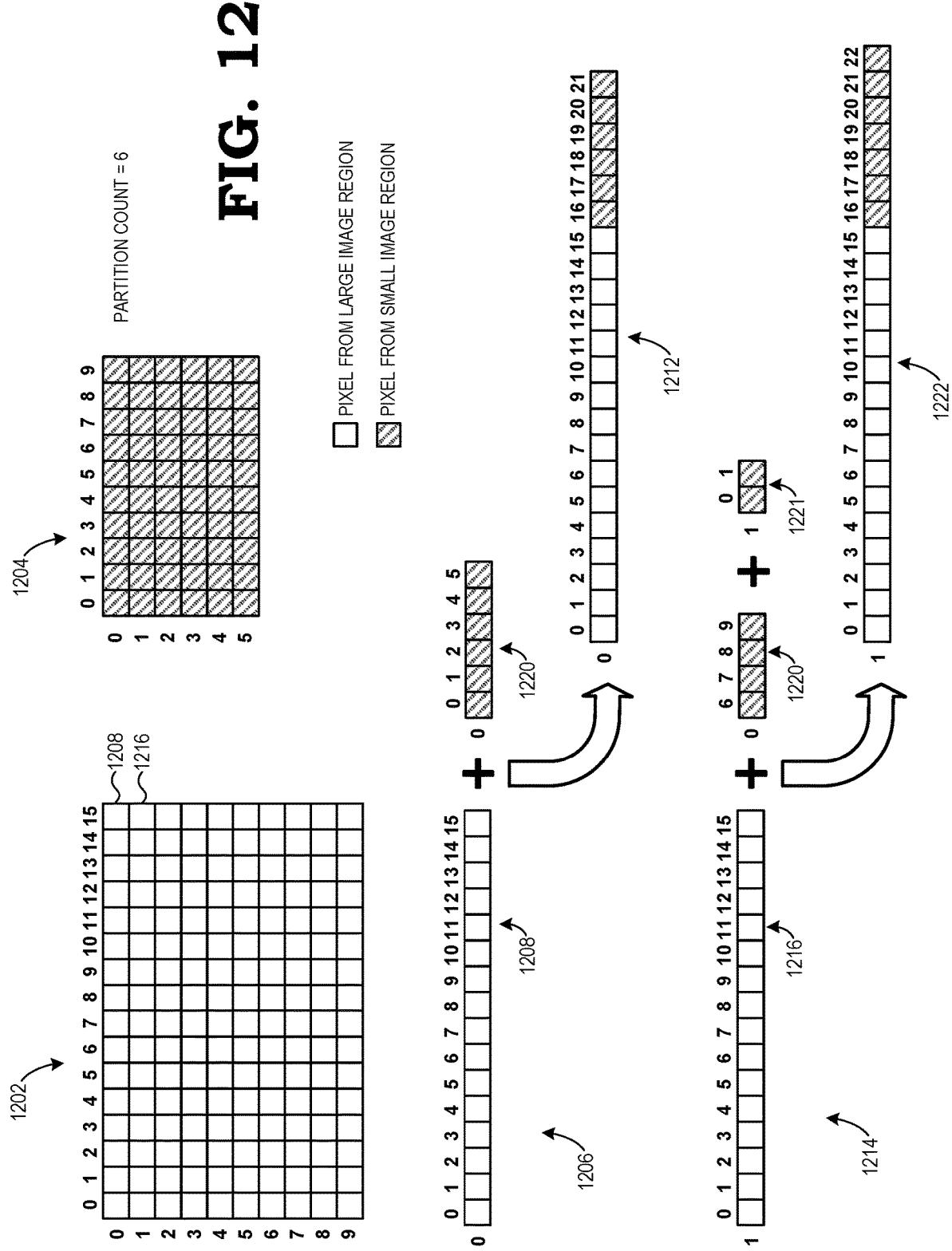
FIG. 12 is a diagram illustrating an example of the method of FIG. 11 in accordance with some embodiments.

FIG. 12 illustrates an example implementation of the method 1100 for combining two image regions in accordance with at least some embodiments. In this example, an image region 1202 having a resolution of 10×16 pixels is to be combined with an image region 1204 having a resolution of 6×10 pixels. As the image region 1202 has the higher vertical resolution, it is designated as the base image region 1201 and the image region 1204 thus is identified as a non-base image region 1204. Using EQ. 1, the partition count is calculated as 6 pixels. Thus, as illustrated by diagram 1206, the pixels of the first row 1208 (row 0) of the base image region 1202 are extracted, as is a set 1210 of the first 6 pixels from row 0 of the non-base image region 1204, and these pixels are combined to generate the illustrated row 1212 (row 0) of twenty-two pixels for a resulting combined pixel array. As illustrated by diagram 1214, to generate the second row 1222 (row 1) of the combined pixel array, the second row 1216 (row 1) of the base image region 1202 is extracted, are the next six pixels from the non-base image region 1204. As shown, only four non-extracted pixels remain in the first row of the non-base image region 1204, and thus this set 1220 of four pixels is extracted from the first row, along with a set 1221 of the first two pixels in the next row (row 1) of the non-base image region so that the total number of pixels extracted from the non-base image region for the second row 1222 of the combined pixel array is equal to the partition count. This process would then continue for each of the remaining eight rows of the base image region 1202, resulting in a combined pixel array having ten rows of twenty-two pixels each.

Figure 13:
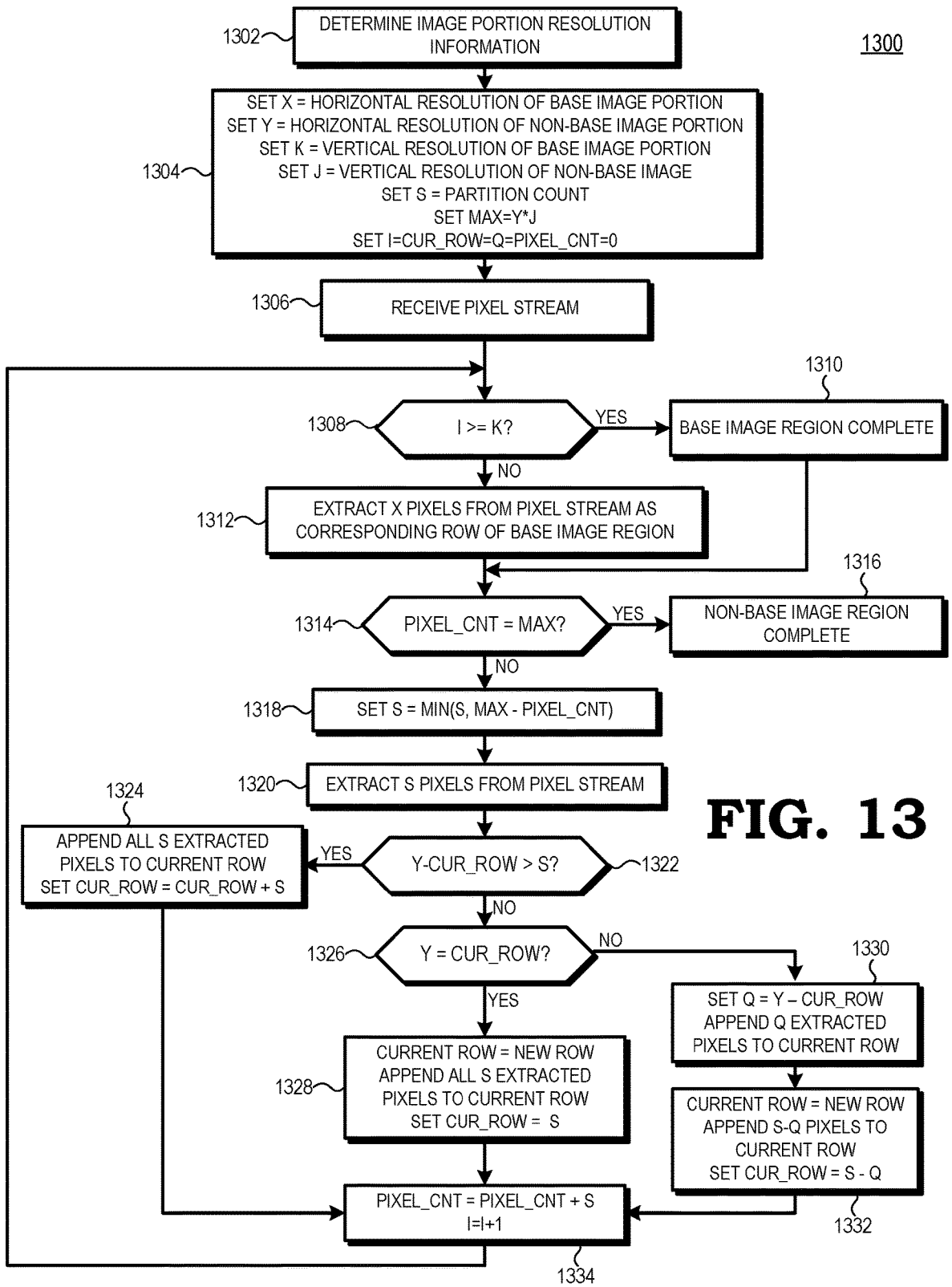
FIG. 13 is a flow diagram illustrating a method for partitioning a combined pixel array into constituent image regions of different vertical resolutions in accordance with some embodiments.

FIG. 13 illustrates an example method 1300 for the partitioning a received combined pixel array into its constituent image regions by the pixel stream separation component 814 in accordance with some embodiments. For the following, it is assumed that received combined pixel array was constructed in accordance with the method 1100 of FIG. 11 and includes a single non-base region. However, the method 1300 may be adapted for multiple non-base regions using the guidelines provided herein. The method 1300 initiates at block 1302 with the pixel stream separation component 814 determining the horizontal and vertical resolutions of each image region. As noted above, this information may be transmitted with the data representing the combined pixel array, or via a side band channel. Alternatively, the size of the foveal region and the peripheral regions are predetermined by both the rendering device 802 and the display device 804, and thus it is unnecessary to separately determine this information. At block 1304, the pixel stream separation component 814 sets various temporary variables, including setting a variable X to the horizontal resolution of the base image region, setting a variable Y to the horizontal resolution of the non-base image region, setting a variable K to the vertical resolution of the base image region, setting a variable J to the vertical resolution of the non-base image region, setting a variable S to the partition count, setting a variable MAX to the number of pixels in the non-base image region (that is, Y*J), and initializing the variables CUR_ROW, Q, I, and PIXEL_CNT to zero. With the pixel stream separation component 814 so initialized, at block 1306 the pixel stream separation component 814 begins receiving and buffering the data stream representing the combined pixel array. The pixel stream separation component 814 then initializes an iteration of a row fragmentation process represented by blocks 1308-1334.

The variable I is used to track the number of rows extracted for the base image region, and the variable K represents the vertical resolution of the base image region. Accordingly, at block 1308, the pixel stream separation component 814 determines whether extraction of the base image region has completed by determining whether the variable I>=K. If so, at block 1310 the pixel stream separation component 814 denotes the reconstitution of the base image region as completed and provides the resulting base image region to the other components of the display controller 610 for further processing, and the method 1300 transitions to block 1314. Otherwise, at block 1312 the pixel stream separation component 814 extracts the next X pixels (or first X pixels for the first iteration) from the pixel stream and outputs this set of X pixels as a corresponding row of the reconstituted base image region.

The variable PIXEL_CNT is used to determine the number of pixels that have been extracted so far for the non-base image region. Accordingly, at block 1314, the pixel stream separation component 814 determines whether extraction of the non-base image region has completed by determining whether the variable PIXEL_CNT=MAX. If so, at block 1316 the pixel stream separation component 814 denotes the reconstitution of the non-base image region as completed and provides the resulting non-base image region to the other components of the display controller 610 for further processing, and the method 1300 terminates for the current image (although method 1300 may be reinitialized for the next image in the pixel stream). Otherwise, the pixel stream separation component 814 prepares to extract the remainder of the row of the combined row of pixels.

It will be appreciated that in some instances, the total number of pixels in the non-base image portion is not an integer multiple of the partition count, and thus the last row of the combined image portion will not be a full row of actual pixel values, but instead may require "don't care" filling; that is, completing the last row with one or more don't care values. To guard against extracting these don't care values and using them as actual pixel values, at block 1318 the pixel stream separation component 814 sets the variable S to the smaller of the value of S or the value of the difference between MAX and PIXEL_CNT (that is, MAX—PIXEL_CNT). Thus, until the last row, the variable S continues to be set to the value of the partition count, but for the last row, if the last row contains don't care values, the value of S will be set to the number of pixel values remaining other than these don't care values.

With the value of S determined for this iteration, at block 1320 the pixel stream separation component 814 extracts the next S pixels from the pixel stream from the pixel stream and outputs this set of Y pixels as a corresponding row of the reconstituted non-based image region. At block 1322, the pixel stream separation component 814 determines whether the current row of the non-base image being reconstituted has a number of unfilled pixels that is greater than the number S of pixels extracted from the pixel stream at block 1320. That is, if Y represents the horizontal resolution of the non-base image and the variable CUR_ROW represents the number of extracted pixels already extracted for the current row, the comparison of S to the difference between Y and CUR_ROW may represent this determination. If this difference is greater than S, the current row being reconstituted will require all of the S extracted pixels plus additional pixels from the next row of the combined image region, and thus at block 1324 all S extracted pixels are appended to the pixels already present in the current row. Otherwise, at block 1326, the pixel stream separation component 814 determines whether the current row is complete by determining whether CUR_ROW=Y. If so, at block 1328 a new row of the non-base image region is started, and this new row is designated the current row. Further, all S extracted pixels from block 1320 are appended or inserted as the first S pixels of this row, and the variable CUR_ROW is set to S to reflect that the current row at this point now has S pixels.

Returning to block 1326, if the current row is not complete, and the current row requires fewer than S pixels to be completed, then at block 1330 the pixel stream separation component 814 sets the variable Q to the difference between Y and CUR_ROW (that is, Q=Y−CUR_ROW) and appends the first Q pixels of the extracted S pixels to the current row of pixels, thereby completing the current row. Accordingly, at block 1332, the pixel stream separation component 814 starts a new row of the non-base image and sets this new row as the current row, inserts/appends the remaining S-Q extracted pixels as the first pixels of the current row, and then sets CUR_ROW to the value S-Q to reflect that the current row presently contains S-Q pixels.

Following the process at the appropriate one of blocks 1324, 1328, or 1332, at block 1334 the pixel stream separation component 814 reflects that S pixels have been added to the non-base image region by increasing PIXEL_CNT by S, and further reflects that a row of the base image region was added at block 1312 by incrementing the variable I by one. The flow of method 1300 then returns to block 1308 for the next iteration.

As explained above, a display system may employ early sub-pixel rendering at rendering device so as to reduce the computational resources utilized to render an image region as well as the bandwidth requirements to transmit the image region to a display device. FIGS. 14-16 illustrate techniques for further reducing the computational and bandwidth requirements for rendering and transmitting an image region in a display system utilizing a non-RGB pixel array through a low-resolution RGB rendering process. Although this low-resolution RGB rendering process is described in the context of rendering of an image region, such as a foveal region or peripheral region in the foveated graphics pipelines described above, this process is not limited to such contexts, but instead may be employed in any of a variety of display systems utilizing a display device having a pixel array with a non-RGB pixel format in which one color component is present at a higher frequency than the other color components of the pixel format. That is, while the low-frequency sub-pixel rendering process described below may be implemented by the display systems 100, 600, and 800, this process is not limited to such systems. As such, reference to "image region" in the description of FIGS. 14-16 also applies equally to an entire image unless otherwise noted.

Turning now to FIG. 14, a display system 1400 implementing a low-resolution RGB rendering process is illustrated in accordance with at least one embodiment. The display system 1400 includes a rendering device 1402 coupled to a display device 1404 via a PHY 1406 having interfaces 1408 and 1410. The rendering device 1402 includes the interface 1408, at least one GPU 1412 and a low-resolution RGB module 1414. The display device 1404 includes the interface 1410, a pixel array 1416 that has a non-RGB pixel format, and a sub-pixel scaling module 1420. In the example of FIG. 14, the low-resolution RGB module 1414 is illustrated as a software-implemented module executed by the GPU 1412, but in other embodiments the low-resolution SPR module 1414 may be implemented entirely in hardcoded logic or programmable logic, or as a combination of a software-implemented module and hardcoded logic or programmable logic. The sub-pixel scaling module 1420 likewise may be implemented as hardcoded or programmable logic, a software-implemented module executed by a processor of the display controller 1418, or a combination thereof.

As a general operational overview, the low-resolution RGB module 1414 operates to render an image region in an RGB format at a lower resolution than the resolution of pixel array 1416. The non-RGB pixel format of the pixel array 1416 has a color component that has a higher frequency than the other components of the pixel array 1416. That is, the non-RGB pixel format results in sub-pixels of one color occurring at a greater frequency than the sub-pixels of the other component of the pixel array 1416. For ease of reference, the color component occurring more frequently/having a higher resolution in the non-RGB pixel format is referred to herein as the "primary color component", whereas the other color components of the non-RGB pixel format are referred to herein as "secondary color components." To illustrate, the RGBG pixel format results in the green color component having a resolution that is twice the resolution of either the red color component or the blue color component. Thus, for the RGBG pixel format, the green color component would be the primary color component, whereas the red and blue color components would be the secondary color components.

Rather than rendering an image region so that the sub-pixels are present at the resolutions dictated by the primary color component of non-RGB pixel format of the display, in at least one embodiment the low-resolution RGB module 1414 instead renders an image region with RGB pixels at the lower frequency of the secondary color components. To again use the RGBG pixel format as an example, an RGBG-formatted image with a horizontal resolution of 400 pixels would have 400 green sub-pixels, but only 200 red sub-pixels and 200 blue sub-pixels. Thus, in such an example, rather than render the image region at a horizontal resolution of 400 RGB pixels as per the conventional approach, the low-resolution RGB module 1414 would instead render the image region at a horizontal resolution of 200 RGB pixels. By RGB rendering the image region with this lower resolution, the resulting image region is represented by less data than would be required to represent the image region using the RGB format at a horizontal resolution equivalent to the horizontal resolution of the RGBG-based pixel array 1416. As such, less bandwidth, complexity, and power is required to compute and transmit the image region to the display device 1404.

As the image region received at the display controller 1418 of the display device 1404 does not have a format directly compatible with the pixel format of the pixel array 1416 by virtue of being in a different pixel format and at a lower resolution, the sub-pixel scaling module 1420 operates to transform the receive image to a pixel format and resolution compatible with the pixel array 1416. As part of this process, the sub-pixel scaling module 1420 upscales each corresponding part of the incoming RGB stream representing the image into a larger number of RGBG output pixels. To illustrate using the RGBG pixel format, as the RGBG pixel format has twice as many green sub-pixels as either red or blue sub-pixels, this upscaling process includes upscaling green sub-pixels from the RGB data of the rendered image portion while maintaining the red and blue sub-pixels at their original resolution. The resulting reformatted image region is thus made compatible with the non-RGB pixel format of the pixel array 1416.

FIG. 15 illustrates a method 1500 depicting the low-resolution RGB rendering process in greater detail in accordance with some embodiments. For ease of illustration, the method 1500 is described with reference to a relatively simple example depicted in FIG. 16. As similarly noted above, the rendering device 1402 may be adapted to connect to any of a variety of types of display devices having pixel arrays with different non-RGB pixel formats. As such, the rendering device 1402 may not have prior knowledge of the particular non-RGB pixel format implemented by the display device 1404. Accordingly, the method 1500 initiates at block 1502 with the low-resolution SPR module 1414 determining the non-RGB pixel format employed by the pixel array 1416. In one embodiment the rendering device 1402 queries the display device 1404 for an indicator of the non-RGB pixel format employed by the display device 1404, or otherwise obtains this indicator from the display device 1404. To illustrate, the rendering device 1402 may transmit the query and receive the indicator in response via a control channel implemented in the PHY 1406 or as parameters embedded in a header or other field of a pixel stream. Alternatively, the rendering device 1402 and the display device 1404 may communicate this indicator via a separate side band channel. For purposes of the example of FIG. 16, it is assumed that the pixel array 1416 implements the RGBG pixel format.

At block 1504, the low-resolution RGB module 1414 identifies which color component is the primary color component and which color components are the secondary color components, and the resolutions of each, based on the non-RGB pixel format. To illustrate, for the conventional RGBG pixel format each pixel is composed of two sub-pixels, which may comprise either a red sub-pixel and a green sub-pixel or a blue sub-pixel and a green sub-pixel. As a result, for an image having a pixel resolution of H×V, the red color component would have a resolution of H/2×V/2, the blue color component would have a resolution of H/2× V/2, whereas the green color component has the higher resolution of H×V. The green color component thus would be identified as the primary color component and the red and green color components would be identified as the secondary color components.

At block 1506, the low-resolution RGB module 1414 renders an image region in the RGB pixel format and with a resolution based on the resolution of the secondary color components of the non-RGB format of the pixel array 1416, as identified at blocks 1502 and 1504. FIG. 16 illustrates an example of an image region 1600 that is rendered at this lower frequency of the secondary color. In this simplified example, the pixel array 1416 has four rows and a horizontal resolution of 8 sub-pixels for the green color component, and 4 sub-pixels for each of the red and blue color components. Accordingly, the image region 1600 is rendered as a 4×4 array of RGB pixels, with each RGB pixel composed of one red sub-pixel, one green sub-pixel, and one blue sub-pixel (e.g., RGB pixel 1602 having red sub-pixel 1604, green sub-pixel 1606, and blue sub-pixel 1608). It will be appreciated that in a typical implementation the resolutions will be much greater than this simple example At block 1508, the resulting low-resolution image region is transmitted to the display device 1404 via the PHY 1406. As the low-resolution image region has been rendered at a lower resolution compared to the conventional approach, the low-resolution image region requires less power and bandwidth to transmit over the PHY 1406. To illustrate, the image region 1600 of FIG. 16 has 48 sub-pixels (4 rows×4 columns×3 sub-pixels/pixel), and assuming each sub-pixel is represented by an 8-bit value, the image region 1600 requires 384 bits. In contrast, in a conventional approach, the image portion would have been rendered at a resolution of 4×8 RGB pixels, and thus have 96 sub-pixels, and thus require 768 bits, or twice the amount of pixel data.

At block 1510, the low-resolution RGB image region is received at the display controller 1418 and the sub-pixel scaling module 1420 converts the RGB image region to the non-RGB format of the pixel array 1416. As part of this format conversion process, the sub-pixel scaling module 1420 upscales the primary color sub-pixels in the RGB image region so that the primary color sub-pixels are present in the resulting high-resolution image region at the same frequency/resolution as found in the non-RGB pixel format of the pixel array 1416, while the secondary color sub-pixels are present at the same frequency as found in the RGB image region, and thus the same frequency as found in the pixel array 1416. To illustrate with reference to image region 1610, which represents the image region 1600 as received by the display controller 1418 and after initial format conversion, the red, green, and blue sub-pixels of the RGB pixels of the image region 1600 are used to generate RGBG pixels comprising either a red sub-pixel and green sub-pixel combination or a blue sub-pixel and green sub-pixel combination. However, as the RGB image has the same number of green sub-pixels as the numbers of red sub-pixels and blue sub-pixels, the upscaling process can include replication of primary color sub-pixels (that is, green sub-pixels in this example) to replace the omitted sub-pixels, such as the replication of the green sub-pixel 1612 to replace the omitted green sub-pixel 1614 in the same row, or the replication of the green sub-pixel 1616 to replace the omitted green sub-pixel 1218 in a different row. Alternatively, the upscaling process can include interpolation of adjacent primary color sub-pixels to generate the omitted sub-pixels, such as interpolation using one or more of the green sub-pixels proximate to the omitted sub-pixel 1620 so as to generate a value for the omitted sub-pixel 1620 in the image region 1610. Image region 1622 of FIG. 16 illustrates the resulting image region, which includes newly-introduced green sub-pixels to fill in for the green sub-pixels omitted from the low-resolution image region rendered and transmitted previously.

As shown, the image region 1622 has the RGBG pixel format, and thus is compatible for display at the RGBG-based pixel array 1416. However, the format conversion and upscaling process of block 1510 results in an increase in the horizontal resolution without a commensurate increase in the vertical resolution of the resulting image portion. Accordingly, to maintain the aspect ratio of the image portion for appropriate display at the pixel array 1416, at block 1512 the sub-pixel scaling module 1420 vertically upscales the image region 1622 using any of a variety of well-known upscaling techniques using one or more of the color components. The resulting horizontally and vertically scaled image portion is thus ready for further processing in preparation for its display at the pixel array 1416, as described above.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. An "application", or "software" may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A foveated display system comprising:
 a rendering device comprising:
  at least one graphics processing unit (GPU) to render a foveal region and a first peripheral region of a first image, the foveal region having a higher resolution than the first peripheral region, wherein the foveal region is composed of a first array of pixels in a first number of rows and a second number of columns, and the first peripheral region is composed of a second array of pixels in a third number of rows and a fourth number of columns; and a pixel stream combination component to combine the foveal region and first peripheral region for transmission as a third array of pixels having a fifth number of rows and a sixth number of columns, whereby the fifth number of rows is equal to the larger of the first number and the third number and the sixth number is based on the second number and the fourth number; and a display device coupled to the rendering device via at least one physical layer, the display device comprising:
a pixel array;
a display controller coupled to the pixel array, the display controller comprising: a scaling component to upscale the first peripheral region to generate a scaled first peripheral region; and
a blending component to blend the foveal region with the scaled first peripheral region to generate a second image; and wherein the rendering device is to transmit the foveal region and the first peripheral region to the display device via the same physical layer.

2. The foveated display system of claim 1, wherein the pixel stream combination component is to generate a row of the third array of pixels by determining a seventh number based on the third number and appending a number of pixels equal to the seventh number from one or more rows of the one of the first array or the second array having the smaller number of rows to a row of pixels of the one of the first array or the second array having the larger number of rows.

3. The foveated display system of claim 1, wherein the display controller further comprises:
a pixel stream separation component to receive the third array of pixels and to separate the third array of pixels into the first array of pixels and the second array of pixels.

4. The foveated display system of claim 1, wherein:
the rendering device further is configured to compress the foveal region to generate a compressed foveal region and to compress the first peripheral region to generate a compressed peripheral region; and
the display controller further is to decompress the compressed foveal region and to decompress the compressed first peripheral region.

5. The foveated display system of claim 1, wherein the display controller further comprises:
a sub-pixel rendering component to sub-pixel render the foveal region to generate the foveal region and to sub-pixel render the first peripheral region to generate the first peripheral region.

6. The foveated display system of claim 1, wherein:
the GPU further is to render a second peripheral region of the first image, the second peripheral region having a lower resolution than the first peripheral region;
the scaling component further is to upscale the second peripheral region to generate a scaled second peripheral region; and
the blending component further is to blend the foveal region, the scaled first peripheral region, and the scaled second peripheral region to generate the second image.

7. The foveated display system of claim 1, wherein:
the display device is a head mounted display (HMD) device; and
the pixel array is implemented in one of a left-eye display panel or a right-eye display panel.

8. The foveated display system of claim 7, wherein:
the HMD device comprises a gaze tracking system to track a gaze direction of at least one eye of a user; and
the GPU is to determine a position for the foveal region for the first image based on the gaze direction.

9. In a foveated display system comprising a rendering device connected to a display device via at least one physical layer, a method comprising:
rendering a foveal region and a first peripheral region of a first image using at least one graphics processing unit (GPU) of the display device, the foveal region having a higher resolution of the first peripheral region, wherein the foveal region is composed of a first array of pixels in a first number of rows and a second number of columns, and the first peripheral region is composed of a second array of pixels in a third number of rows and a fourth number of columns;
combining the foveal region and first peripheral region for transmission as a third array of pixels having a fifth number of rows and a sixth number of columns, whereby the fifth number of rows is equal to the larger of the first number and the third number and the sixth number is based on the second number and the fourth number;
transmitting the foveal region and the first peripheral region to the display device via the same physical layer;
upscaling, at a display controller of the display device, the first peripheral region to generate a scaled first peripheral region; and
blending, at the display controller, the foveal region and the scaled first peripheral region to generate a second image.

10. The method of claim 9, wherein:
foveal region is composed of a first array of pixels in a first number of rows and a second number of columns;
the first peripheral region is composed of a second array of pixels in a third number of rows and a fourth number of columns; and
the method further comprises:
combining the foveal region and first peripheral region for transmission as a third array of pixels having a fifth number of rows and a sixth number of columns, whereby the fifth number of rows is equal to the larger of the first number and the third number and the sixth number is based on the second number and the fourth number.

11. The method of claim 10, wherein combining the foveal region and first peripheral region comprises:
generating a row of the third array of pixels by determining a seventh number based on the third number and appending a number of pixels equal to the seventh number from one or more rows of the one of the first array or the second array having the smaller number of rows to a row of pixels of the one of the first array or the second array having the larger number of rows.

12. The method of claim 10, further comprising:
receiving, at the display controller, the third array of pixels via the same physical layer; and
separating, at the display controller, the third array of pixels into the first array of pixels and the second array of pixels.

13. The method of claim 9, further comprising:
compressing the foveal region at the rendering device to generate a compressed foveal region;
compressing the first peripheral region at the rendering device to generate a compressed peripheral region;
decompressing the compressed foveal region at the display controller to generate the foveal region;

decompressing the compressed first peripheral region at the display controller to generate the first peripheral region; and wherein transmitting the foveal region and the first peripheral region comprises transmitting the compressed foveal region and the compressed first peripheral region.

14. The method of claim 13, further comprising:

transforming, using at least one GPU of the rendering device, a pixel format of the foveal region and the first peripheral region from a red-green-blue (RGB) pixel format to a non-RGB pixel format.

15. The method of claim 9, further comprising:

transforming, using at least one GPU of the rendering device, a format of the foveal region and the first peripheral region from a red-green-blue (RGB) pixel format to a non-RGB pixel format.

16. The method of claim 9, further comprising:

rendering, using at least one GPU of the rendering device, a second peripheral region of the first image, the second peripheral region having a lower resolution than the first peripheral region;

transmitting the second peripheral region from the rendering device to the display device via the at least one physical layer;

upscaling, at the display controller, the second peripheral region to generate a scaled second peripheral region; and blending the foveal region and the first peripheral region further comprises blending the foveal region, the first peripheral region, and the second peripheral region to generate the second image.

17. The method of claim 9, wherein the display device is a head mounted display (HMD) device.

18. The method of claim 17, further comprising:

tracking a gaze direction of at least one eye of a user; and determining, at the rendering device, a position for the foveal region in the first image based on the gaze direction.

19. In a foveated display system comprising a rendering device connected to a display device via at least one physical layer, a method comprising:

rendering a foveal region and a first peripheral region of a first image using at least one graphics processing unit (GPU) of the display device, the foveal region having a higher resolution of the first peripheral region;

transmitting the foveal region from the rendering device to the display device via a first physical layer and transmitting the first peripheral region from the rendering device to the display device via a second physical layer distinct from the first physical layer, wherein the second physical layer is selectively implemented with a slower pixel clock than the first physical layer;

upscaling, at a display controller of the display device, the first peripheral region to generate a scaled first peripheral region; and blending, at the display controller, the foveal region and the scaled first peripheral region to generate a second image.

* * * * *